(12) United States Patent
French

(10) Patent No.: US 10,781,720 B2
(45) Date of Patent: *Sep. 22, 2020

(54) MULTI-STAGE RADIAL FLOW TURBINE

(71) Applicant: John French, Pasadena, TX (US)

(72) Inventor: John French, Pasadena, TX (US)

(*) Notice: Subject to any disclaimer, the term of this patent is extended or adjusted under 35 U.S.C. 154(b) by 141 days.

This patent is subject to a terminal disclaimer.

(21) Appl. No.: 15/831,567

(22) Filed: Dec. 5, 2017

(65) Prior Publication Data

US 2018/0163567 A1 Jun. 14, 2018

Related U.S. Application Data

(60) Division of application No. 14/489,644, filed on Sep. 18, 2014, now abandoned, which is a continuation-in-part of application No. 14/209,019, filed on Mar. 13, 2014, now Pat. No. 9,856,853.

(60) Provisional application No. 61/782,044, filed on Mar. 14, 2013.

(51) Int. Cl.

| F01D 25/24 | (2006.01) |
|---|---|
| F01D 1/06 | (2006.01) |
| F03D 3/04 | (2006.01) |
| F01D 15/08 | (2006.01) |
| F01D 15/10 | (2006.01) |
| F01D 9/04 | (2006.01) |
| F01D 5/06 | (2006.01) |
| F01D 5/04 | (2006.01) |
| F03D 13/20 | (2016.01) |
| F03D 3/02 | (2006.01) |
| F03D 3/00 | (2006.01) |
| F03D 9/00 | (2016.01) |
| F01D 17/10 | (2006.01) |
| F03D 9/25 | (2016.01) |
| F03D 1/04 | (2006.01) |
| F03B 3/00 | (2006.01) |
| F03B 13/08 | (2006.01) |

(52) U.S. Cl.
CPC ............... *F01D 25/24* (2013.01); *F01D 1/06* (2013.01); *F01D 5/04* (2013.01); *F01D 5/06* (2013.01); *F01D 9/041* (2013.01); *F01D 15/08* (2013.01); *F01D 15/10* (2013.01); *F01D 17/105* (2013.01); *F03B 3/00* (2013.01); *F03B 13/08* (2013.01); *F03D 1/04* (2013.01); *F03D 3/005* (2013.01); *F03D 9/25* (2016.05); *F03D 13/20* (2016.05); *F05B 2210/16* (2013.01); *F05B 2240/13* (2013.01); *F05B 2240/93* (2013.01); *F05B 2240/941* (2013.01); *Y02E 10/22* (2013.01); *Y02E 10/223* (2013.01); *Y02E 10/727* (2013.01); *Y02E 10/74* (2013.01); *Y02T 50/672* (2013.01)

(58) Field of Classification Search
CPC . F01D 1/023; F01D 1/06; F01D 1/085; F02C 3/085
See application file for complete search history.

(56) References Cited

U.S. PATENT DOCUMENTS

| 2,268,929 A * | 1/1942 | Dupont | F01D 1/06 415/87 |
|---|---|---|---|
| 2,374,671 A * | 5/1945 | Dupont | F01D 1/06 415/83 |
| 9,856,853 B2 * | 1/2018 | French | F03D 9/00 |

* cited by examiner

*Primary Examiner* — Kenneth J Hansen
*Assistant Examiner* — Brian O Peters
(74) *Attorney, Agent, or Firm* — Fay Sharpe LLP

(57) ABSTRACT

Various multi-stage radial turbine configurations that provide highly efficient momentum transfer between a fluid and the mechanical interface in both power producing and power consuming undertakings.

15 Claims, 21 Drawing Sheets

| For unit square: | Square | Circle |
|---|---|---|
| Equivalent Diameter: | 1.0 | 1.0 |
| Cross Section: | 1.000 | 0.785 |

---

| For width = 1: | Squared Corners | Rounded Corners |
|---|---|---|
| Equivalent Diameter: | 1.333 | 1.389 |
| Cross Section: | 2.000 | 1.785 |

Simple 4x2 foot Collector

Vehicle Shape Accentuating Collector

MULTI-STAGE RADIAL FLOW TURBINE

The present invention is a divisional of U.S. patent application Ser. No. 14/489,644 filed Sep. 18, 2014, which in turn is continuation-in-part of U.S. patent application Ser. No. 14/209,019 filed Mar. 13, 2014, which in turn claims priority on U.S. Provisional Patent Application Ser. No. 61/782,044 filed Mar. 14, 2013, which are all incorporated herein by reference.

The present invention is directed to a multi-stage radial turbine for usage in energy capture from fluid streams with low to moderate specific speed. The turbine can also be driven and used as a very efficient liquid pump and gaseous phase fan or compressor. Additionally, combining compression, a burner, and energy capture creates a new type of internal combustion engine. FIG. 1 introduces and illustrates most simply some of the wide range of configurations that can utilize this new type of turbine.

BACKGROUND OF THE INVENTION

Various radial designs for a turbine have been utilized since the dawn of the industrial revolution and their characteristic flow is found in numerous patents. FIG. 2 provides a qualitative graph that is slightly modified from that found in "Mechanics of Fluids"; author: Irving Shames; ISBN 0-07-056385-3, page 616.

The graph illustrated in FIG. 2 shows through curves of efficiency versus specific speed whether the optimal flow regime is either radial, axial or the transitional range between these two. At low speeds, the radial orientation provides superior efficiency. This graph is a qualitative selection tool. The calculations required to quantify the specific speed can be rather complex and include the fluid flow rate and physical properties as well as the mechanical geometry and rotational speed. Without usage of any quantitative calculations, deductive reasoning can be used to categorize wind as having a very low specific speed. In the case of wind energy, a proposed site's wind speed distribution is important data for any type of economic feasibility study. Average wind speeds can be mapped into regions and given classification values that typically fall from one to five. Axial flow wind turbines are typically built in class four regions. Class three regions are considered a minimum requirement for these types of wind turbines and class five or higher regions are not commonly encountered. At fifty meters height, a class four average wind speed falls between about 15.7 and 16.8 mph. Comparing this wind speed to that of typical propeller-driven aircrafts at optimal cruising speeds illustrates the great disparity between the most efficient speed for axial flow wind devices and the operational speeds encountered in tower-mounted wind turbines.

Interestingly, in the operation of modern propeller-type wind turbines, both the cut-out speed (where blades are feathered to prevent overpowering the generator) and the park speed (where rotation is stopped and one blade is aligned with the tower in a self-preservation mode) have relatively low specific speeds. Much work has been done upon the axial design using various airfoil profiles and blade rotation to achieve today's level of observed performance; however, the axial flow design is believed to utilize a much less than optimal flow orientation.

SUMMARY OF THE INVENTION

The present invention is directed to a multi-stage radial turbine for usage in energy capture from fluid streams with low to moderate specific speed. The primary sources of low energy content streams include wind and gravitational flow of water; however, other energy sources can be used. Additionally, the turbine can be driven and utilized as a liquid pump, gaseous phase fan, or gaseous phase compressor. The efficiency of the turbine allows it to be incorporated into many different devices such as, but not limited to, non-stationary land-based vehicles and waterborne vessels. When the turbine is used for land-based vehicles or other types of non-stationary devices, the velocity differential between the device and the surrounding fluid can create the motive force necessary to drive the turbine; however, this is not required. The resulting shaft work produced by the turbine can be used to drive generators and/or other types of rotating equipment. The design and mechanism by which the turbine is driven is novel to the art. The traditional wind energy devices have air directed along the axis of rotation of the turbine blade and such designs have been found to be much less efficient than the design of the present invention. It has been found that applications for extracting energy from a fluid that utilize wind or other low energy content streams stand to gain significantly increased performance by utilizing flow oriented in a radially outward direction. The radial design can also be optimized for higher energy content streams where the initial stages' orientation is that of transitional flow. These optimized configurations that benefit from initial transitional flow orientation typically will conclude with a radial section of stages that is far superior once the energy content of the feed stream has been reduced.

In another non-limiting application of the present invention, combining a radial compressor, a burner and a radial energy capturing turbine creates a new class of internal combustion engine that is analogous to a multi-staged, axial flow turbine engine. One non-limiting advantage of the radial design is that it can operate efficiently in flow conditions that are much slower and/or have rotational speeds that are greatly reduced than the necessary minimum speeds for axial designs. These slower flows are actually most commonly encountered. For example, stationary fans typically are used to accelerate air that begins at near stagnant velocity.

Of importance is the understanding of the physics-based mechanism of the radial turbine design that leads to huge performance gains over conventional designs. The radial turbine mechanism is "momentum vector delta." Conventional axial flow, propeller-style wind turbine devices directly extract energy via impingement and/or lift generated by airfoil profiles incorporated into the rotating blades. Both impingement and airfoil energy extraction can be considered as a high shear rate mechanism. The conventional axial flow designs are limited by the amount of energy contained in the fluid stream. The Betz's Law and its fluid stream energy content based derivation emphasize the energy content limitation of 59.3% of the kinetic energy of the wind stream. Conventional wind turbines achieve 75 to 80% of the Betz Limit.

The radial design is based upon capturing the force that is induced by the stream's momentum vector being perpendicularly turned. This is analogous to gravitational forces acting upon a satellite in circular orbit. Because the angle between force and fluid is perpendicular, there is no work done on or by the fluid. The relationship between applied force and work is one of the cornerstones of basic physics and is expressed as "the product of the component of the force in the direction of the displacement and the magnitude of the displacement." The following equation describes this relationship:

$$W=(F \cos \theta)s$$

Where: W=work, F=Force, θ=angle, s=displacement

An applied force that is perpendicular makes the cos θ quantity zero. Thus, the energy content of the wind in the radial design does not directly contribute to the power and work being produced. The wind's kinetic energy is consumed strictly in overcoming the pressure drop through the system that is specifically optimized to keep pressure drop to a minimum. The effect of the radial turbine's vane curvature is to change the stream's momentum vector direction and it is this change in momentum vector direction (not magnitude) that creates the force upon the radial turbine's vanes.

Regarding another analogy, consider an endless stream of football players running by stationary lines of coaches arrayed in curved paths. Each coach pushes the player perpendicularly and changes the player's direction but does not affect the magnitude of the player's velocity. The radial turbine captures the energy expended by the arms of the coaches. The amount of energy that can be extracted by momentum vector delta can greatly exceed the kinetic energy content of the stream.

The new radial design turbine/collector combination of the present invention is believed to result in improved performance and which exceeds the axial flow performance by an order of magnitude or greater of prior devices. This huge performance difference can be observed using the provided graph (FIG. 2) and by simply visually extending the axial flow efficiency curve far to the left to where is located the very low specific speeds of fluid flow classification. As is evident from FIG. 2, the novel design of the present invention can obtain efficiency values that were heretofore unachievable at low fluid speeds.

The predicted performance increase of the present invention results from more than the handling of flow in a radial nature. Also of major influence is the acceleration of the feed stream, the multi-stage handling, and/or the precisely controlled discharge of the spent wind or exhaust stream. Mathematical modeling of the combined effects of the major contributing influences and their associative relationships have been used to quantify performance expectations.

The typical arrangement for power extracting calls for inside-out flow. Power imparting applications mostly flow outside-in. In the case of internal combustion engines that utilize multi-layered, multi-staged platforms, the entrance and exit layers typically will adhere to the above guidelines. Special circumstances that have spatial limitations may be encountered that require deviation from the typical flow direction; however, performance degradation is expected.

Analogous to the stages found in axial flow turbines, radial turbine stages alternate between bending the flow to create a tangential velocity component and straightening the flow to align it in a radially outward direction.

Most power extracting applications begin and end with a bending stage. The bending stages typically have a greater amount of curvature and thus are capable of extracting a greater amount of power than straightening stages. Most applications will utilize stationary straightening stages to simplify the mechanical complexity, reduce maintenance requirements, and/or reduce equipment cost; however, some applications with high energy sources (such as compressed steam) may benefit from a counter rotating arrangement. Each application must be evaluated individually.

Power imparting applications are the reverse of extracting applications. The vane shape used to extract power by receiving a radially outward flowing stream and bending it to induce a tangential velocity component while allowing the stream speed to slow via expansion remains unchanged. However, its interaction with the stream is completely reversed in the power imparting roll. Power is consumed as the stream is volumetrically compressed and accelerated radially inward. Describing this action as "scooping" allows for ease of interpretation. The alternating stages' vane shape also remains unchanged. But again, their effect on the stream is also reversed. Further compression and acceleration takes place as the stream is forced to take on a tangential velocity component. The tangential velocity inducing stages are analogous to stator stages in axial flow designs. Here, again, the stages with the least amount of curvature are typically stationary. The tangential angle of departure of the bent stream should be aligned with the entrance angle of the following scoop stage. This alignment is illustrated in FIG. 14.

Mathematical modeling of the fluid dynamics has evolved enough to allow for significant optimization and performance prediction of power extracting applications. The model can be used to calculate and balance the primary momentum transfer effects within the stages, the pressure drop associated with each component of the system, and/or transitional effects from one component to the next. The model can be a bulk flow model that utilizes classical thermodynamics and traditional fluid flow equations (e.g., see equations in Crane Technical Paper No. 410). Optimization parameters include, but are not limited to: component sizing; the number of stages; each stage's vane count, speed of rotation, and curvature; the distributor geometry; the diffuser geometry; and/or the intra-stage height profile. Optimization generally requires a time-based performance determination over the full range of operational conditions. For wind applications, a Weibull wind speed distribution can be used to fairly represent the time fractions at varying weather conditions.

Each application can be optimized by primarily focusing on its dominating characteristic. For low energy feed streams, the dominating characteristic is generally pressure drop and thermodynamic balance is generally of secondary importance. The optimization of applications with high energy feed streams generally requires the design focus to be placed on thermodynamic equilibrium and entropy minimization with pressure drop remaining important, but generally not being the dominating characteristic.

Further refinement of the mathematical model using discreet element analysis methods—advanced Computational Fluid Dynamics ("CFD")—can be used to allow the inclusion of effects associated with secondary flows so as to produce an improved performance prediction; however, this is not required as secondary flow losses are included in the overall pressure drop equations found in bulk fluid flow type analysis. The effects of secondary flows are encountered any time a stream is forced to change direction.

In one non-limiting arrangement of the invention, there is provided a turbine system comprising a collector, a distributor and one or more multi-vane radial turbine stages. The one or more turbine stages are either stationary or rotatable about a common axis. At least one of the stages is non-stationary and rotatable about the common axis. The collector is designed to capture and direct a portion of an open and freely flowing fluid to the distributor. The distributor is designed to evenly distribute and turn the collated stream it receives into a radially outward flow that is oriented into the entrance of the a 1st turbine stage. The fluid contact with a plurality of vanes as the fluid flows radially outward from the common axis causes said non-stationary turbine stage to rotate about said common axis. The collector includes a first opening, a second opening and a body passageway therebetween. The first opening has a first cross-sectional area and is designed to receive fluid and direct such received fluid into the body passageway. The second opening has a second cross-sectional area and is designed to allow fluid to exit the body passageway and the collector. The first cross-sectional area is generally greater than the second cross-sectional area; however, this is not required. A central flow path of the collector body may remain in a straight line congruent with the direction of the feed stream; or may have curvature of up to 90° to allow design freedom needed to place the distributor in the most advantageous orientation that is dependent upon both the specific application and size of equipment. The distributor includes a first passageway whose perimeter contains the fluid stream from the collector, a second passageway that directs the fluid stream into the first turbine stage, and an interconnected passageway body that contains the fluid stream between said passageways. The interior of the passageway body can optionally include additional passageways that divide the primary flow into multiple flows with parallel orientations. Thus at minimum are two surfaces, one surface being an impact surface in regards that the fluid directly impinges upon its surface and a second surface being a containment surface that completes the passageway body of said distributor. The effect of the distributor is to direct a collated bulk fluid stream into one that is radially dispersed and that directs the flowing fluid into the first turbine stage. The first turbine stage flow orientation may be purely radial or it can be within the transitional flow definition wherein flows are transitioning from being purely axial to that of becoming purely radial. A diverter valve can optionally be included that diverts away a controllable fractional amount of the bulk stream to limit the flow rate handled by the downstream radial stages. A plurality or all of the stages can have an overall cylindrical geometry. One or more of the stages can include a first opening, a second opening, and a body passageway therebetween. Each of the openings can be primarily oriented towards or away from the common cylindrical axis, and in the case of pure radial flow being oriented precisely towards or away from the common cylindrical axis. The body passageway of the stages can be confined by surfaces that comprise a floor and ceiling when the common axis is vertical with the horizon. The distance between the floor and ceiling can be the same at the entrance and exit; however, they will typically have different measurements. Within the body passageway of one or more stages is a plurality of curved vanes extending from the floor to ceiling and which interact with the fluid stream thereby causing said stream's direction of flow to be altered. One or more of the stage's vane curvature is selected to perform one of two functions. These functions are to bend a radially aligned stream into having a tangential velocity component or straighten a stream with a tangential velocity component into one that is radially aligned. The vertical vanes that span from the floor to the ceiling an optionally incorporate a corner rounding profile, varying vane wall thickness, and/or varying floor to ceiling height with one non-limiting purpose of maintaining a constant hydraulic radius along the flow path as used in low energy density feed stream applications or in the case of higher energy feed streams to minimize entropy delta or other thermodynamic objectives as necessitated to optimize overall performance. The one or more stages that are non-stationary can optionally have a suspension system that allows individual freedom of rotation around the common axis, and/or a common suspension system whereas one or more of the non-stationary stages rotate as a combined unit, or a combination of combined and individual suspension systems. The diffuser can include a first opening, a second opening and a body passageway therebetween. The first opening has a first cross-sectional area and is designed to receive fluid flowing radially outward from said outer most stage and to direct such received fluid into said body passageway. The second opening has a second cross-sectional area and is designed to allow fluid to exit the body passageway and the diffuser. The first cross-sectional area can optionally be less than the second cross-sectional area. One non-limiting purpose of the purpose of the diffuser is to smooth the transition of the turbine system's exhaust in a manner that reduces overall system pressure drop. A shroud can be optionally provided. The shroud can be positioned near the diffuser to reduce interference from fluid that did not enter the collector with fluid that is exiting the diffuser. The shroud may optionally have multiple sections around the periphery of the diffusor to optimize usage of the negative gauge pressure draft that results from the fluid being displaced around an object placed in its flow path. A pump, motor and/or electric generator can optionally be included. The rotation of the one or more turbine stages is designed to power the pump, the motor, and/or drive the electric generator to cause electric power to be generated by the electric generator. The fluid can be provided via a closed conduit in place of the open collector. The one or more turbine stages can be driven and consume power for the purpose of creating pumps, fans, blowers, and compressors. These driven devices will typically have flow direction opposite that of power producing configurations. Therefore flow is predominately radially inward. An increased stage count can be compactly achieved by having multiple layers of turbine stages. Flow within each layer of stages reverses direction from the preceding layer of stages such as from radially inward to radially outward or from radially outward to radially inward. Additional body passageways can optionally be added to direct one layer of stages outlet to the inlet of the next layer of stages. The turbine system can combine a turbine compression of air, a combustion chamber, and a radial turbine power extraction to create a radial turbine internal combustion engine. The compression and power extraction stages can be single or multi-layered. The turbine system can be mounted on a moving platform whereas the differential velocity between the platform and the surrounding fluid provides the velocity gradient needed for the turbine system to extract power. These platforms can be land based road vehicles (cars, trucks, or other wheeled transports), rail mounted vehicles (open rail trains or closed rail courses used for power generation), or waterborne vessels (surface ships and underwater vessels). A movable frame can be optionally provide that is designed to allow the collector, the distributor, the one or more non-rotating turbine stages, and the optional shroud to be connected to the frame. The frame can include wheels that enables the movable frame to travel on a road or rail system.

The components comprising the new designs and their operational characteristics, along with other features and advantages, will become apparent to those skilled in the art upon the reading and following of this description taken together with the accompanying drawings.

BRIEF DESCRIPTION OF THE DRAWINGS

The drawings that are provided illustrate various embodiments that the invention may take in physical form and in certain parts and arrangements of parts wherein.

DESCRIPTION OF NON-LIMITING EMBODIMENTS OF THE INVENTION

Referring now in greater detail to the drawings, wherein these showings are for the purpose of illustrating various embodiments of the invention only, and not for the purpose of limiting the invention, the present invention is directed to a multi-stage radial turbine for usage in energy capture from fluid streams with low to moderate velocity. One non-limiting advantage of the radial design is that it can operate efficiently in flow conditions that are much slower and/or have rotational speeds that are greatly reduced than the necessary minimum speeds for axial designs. Additional discussion and quantification of expected performance gains by controlling secondary flows are set forth in more detail below.

Power from Wind

In one non-limiting aspect of the present invention, the invention is directed to a radial design having improved performance for producing electrical power from wind-driven devices. Several of the design aspects of the wind-driven turbine have a direct correlation to other applications. Thus, the wind energy discussion herein serves as a basis from which other applications can be derived with similarities and differences easily distinguished.

The components used to extract power from wind generally include: (1) a collector, (2) an inlet distributor that feeds the innermost turbine, (3) multiple radial turbines, (4) an exit or exhaust diffuser, (5) a shroud at near grade level to route prevailing wind around the turbine assembly, and (6) one or more generators with electrical conditioning equipment and controls.

1. The Collector

Figure 3:
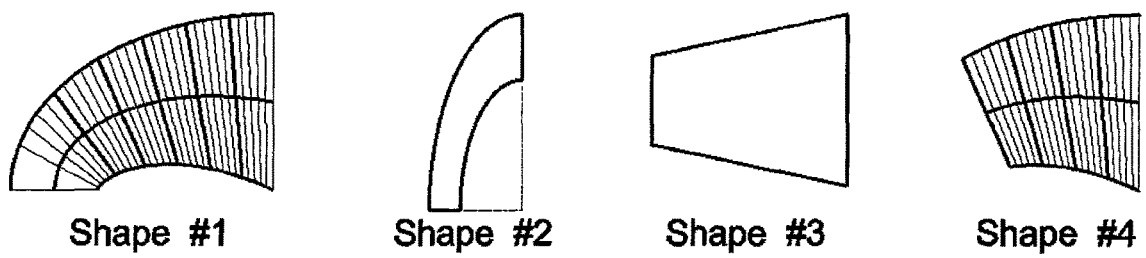
FIG. 3 illustrates categories of non-limiting shapes of collectors in accordance with the present invention.

In the case of extracting energy from wind, the most visibly dominate feature is the collector that captures a portion of the wind flow and directs this flow to the inlet distributor. Four primary shapes for the collector in accordance with the present invention are set forth in FIG. 3; however, it can be appreciated that there are other shapes of the collector that can be used in accordance with the present invention (e.g., usage of shapes with non-circular perimeter cross sections taken perpendicular to the primary flow path—see FIG. 27). One of the collectors set forth is particularly favorable for large, commercial scaled power generating applications. It and the other non-limiting shapes illustrated in FIG. 3 are discussed as follows:

Shape #1:

This collector utilizes an elongated entrance with a bend angle of about 90°. This is one non-limiting shape for equipment sized to produce commercial quantities of electricity. This boxier shape, as compared to Shape #2, provides greater inlet area and greater structural stability characteristics. The sloped inlet floor allows for some of the precipitation that may enter the collector to drain outward. The layout's radial lines can be equally spaced along a line connecting the endpoints of the cross section's lower curvature; however, this is not required. The resulting power output is potentially increased by greater than an order of magnitude based upon inlet area as compared against the swept area of current axial flow propeller designs. This is the most favorable shape for large scale wind energy configurations.

Shape #2:

This collector incorporates a continuously reducing radius and a bend angle of about 90°. Essentially, Shape #2 is a wind sock shape with a bend of about 90°. As can be appreciated, the angle of bend can be less than 90°. The collector is capable of producing more than double the power of current radial designs when the collector's size is chosen such that its opening's center is equal to the hub height of comparable axial flow designs.

Shape #3:

This collector incorporates a straight funnel or wind sock configuration. This shape has the advantage of no secondary flow concerns. Small, residential-sized wind energy systems can be designed that utilize this shape. This shape is also a good choice for waterborne applications and applications where the inlet stream is contained within a conduit.

Shape #4:

This collector utilizes a reducing radius and a bend angle of less than about 90°. This shape is generally used for specialized applications—typically vehicle mounted; however, this is not required. This shape allows for a transition from the straight funnel to any bend angle necessitated for practical reasons up to and including that of having about 90° of flow directional change.

Collector shape #1 can generally be sized such that it has the most compact configuration for the amount of inlet cross sectional area while maintaining a circular cross section flow path perpendicular to average velocity vector from inlet to outlet. The larger opening is to be oriented directly into the wind stream and the bend is used to convey the captured wind to near grade level; however, this is not required. Many advantages of near grade level can be achieved and these include, but are not limited to: (1) increased accessibility of rotating equipment, (2) generators, electrical conditioning, and controls being fixed at near grade level no longer have as strict of size limitations as compared to tower-mounted axial flow designs, (3) no cable winding concerns as a result of the generators being fixed in place, and/or (4) a reduced dependence upon high lift cranes needed for assembling and servicing. The collector can create a contained and accelerated flow. Internal baffling can optionally be used to minimize the twin helix secondary flows that typically result from bending of primary flows. Available power varies approximately with the cube of fluid velocity and the acceleration provided by the collector contributes to the overall performance of the design. Approximately 60% of the wind directly opposing the collector inlet may be rejected. Even with this large rejection rate, having a contained flow at increased velocity that is routed through highly optimized radial turbine stages produces much greater power than axial flow, non-contained stream, propeller designs.

The radius of bend for the collector is generally at its maximum at the collector's inlet where its diameter is the largest; however, this is not required. The bend radius can continuously decrease as the collector diameter decreases to its minimum at the collector outlet. The collector design can vary from that of a rigid structure (i.e., composed of triangulated or geodesic beams as a framework) to one with great flexibility (such as realized from choice of a single-walled wind sock or even a double-walled wind sock that is inflated to help maintain its shape). One of the primary attributes of importance is the overall functionality of the collector in accordance with the present invention.

The collector may optionally incorporate an extended hood shape at its highest point to minimize blowing precipitation from being entrained in the captured airstream. Large, commercial-scale collectors can be mounted on tracks with horizontal alignment carefully achieved using a stationary guide rail; however, this is not required. When used, baffling within the collector serves a dual purpose. Baffling allows the pressure drop associated with secondary flows to be minimized. Also, at wind speeds which push the generators beyond their capacity, the baffles can be mechanically rotated to restrict the flow of wind through the entire assembly; however, one non-limiting method for adjusting flow rate can utilize a diverting valve configuration that is part of the distributor and which is discussed in more detail below. The collector's skin can be of rigid material such as a thin sheet metal; however, other or additional materials can be used (e.g., plastic, composite materials, ceramics, sail cloth or specialized polymer sheeting may provide a more economical choice of building material).

2. The Distributor

The distributor's purpose is to create the radial direction of flow while turning the fluid stream it receives from the collector such that the stream's flow is aligned with the entrance of the first turbine stage. For collectors with about a 90° bend, this radially outward flow can be horizontal to the ground; however, this is not required. The distributor discharges into the first turbine stage that is typically a rotating stage that bends the radial flow into a flow with a tangential velocity component; however, the first stage could be stationary and also used to either radially straighten or condition the flow direction such that it optimally feeds the follow-up stage.

Current modeling of wind energy applications suggests that the inlet distributor is most likely a single cone-type configuration; however, other shapes can be used. The optimized diameter of the turbine stages can be used to define the distributor's exit diameter. Modeling results emphasize the radial design's advantage as indicated by the downward concavity of the system's performance to distributor exit diameter curve. Even at wind speeds accelerated by the constricting process of the collector, the optimized configuration is solidly in the radial flow regime. This is emphasized in the cross sectional drawing of FIG. 4 that illustrates the diameter relationships of the various post-collector stream handling components. The adding of full or partial cones beyond the single-cone configuration may improve the performance of wind energy applications. Other power-extracting implementations using higher velocity streams are expected to trend towards reduced turbine stage diameters while still remaining radial flow in nature, but trending towards dimensions where peak power is achieved via higher rotational velocities. It is believed that the higher velocity feed stream applications may have increased cone count, either full or partial cones, to help turn the stream about 90° in the more constrained spatial arrangement. Additionally, if the feed stream is of sufficient energy, a highly optimized design might find the first and possibly even a portion of the second stage to have flow orientation within the transitional definition. Transitional flow turbine configurations use the initial stages to perform some or even all of the feed stream directional change from a collated linear stream to being dispersed radially outward. Transitional stages utilize vane shapes that may be complicated by the amount of twist used to perform the additional directional change as compared to purely radial stages.

Figure 4:
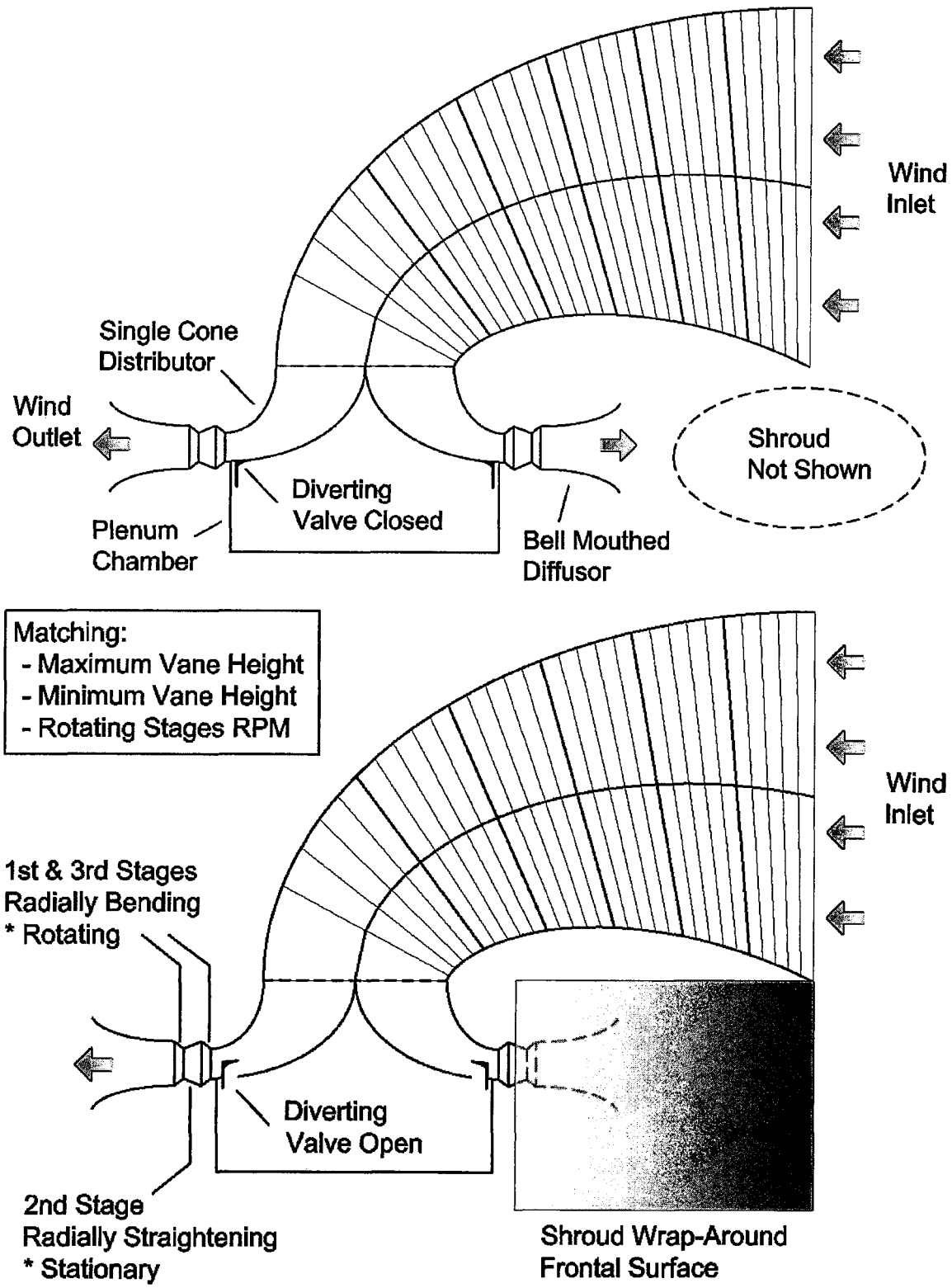
FIG. 4 is a diagram that illustrates sized turbines where the maximum height of each stage is equal as well as the minimum height of each stage.

The distributor can also provide the recommended location for the control that limits the maximum quantity of wind allowed to the turbine assembly. This control can be a radial flow diverting-style valve that both splits away a portion of the wind stream and acts as an obstruction in the primary flow path; however, this is not required. The two diagrams illustrated in FIG. 4 show the diverting valve in closed and opened positions. The plenum chamber exhaust may be ducted to provide cooling air flow to the generators. The plenum is also a work space as it houses the diverting valve actuating equipment that will generally require periodic inspection and maintenance. The positive pressure of the plenum suggests entryway doors to be of a sliding-type design for enhanced safety; however, this is not required. Additional analysis can be used to quantify the amount of cooling air needed by the generators over the full range of operability. Slightly oversizing the collector inlet to make up for the loss of diverted flow for cooling purpose can be utilized. Additionally, the distributor can be incorporated into the collector such that a continual decrease in cross sectional area occurs up to the exit point of the distributor. This incorporation allows the throat diameter of the collector to be slightly enlarged and allow for a smoother transition of flow between the collector and distributor. Interestingly, the usage of bulk fluid pressure drop equations results in collector/distributor wall angle and cross sectional area relationships that closely duplicate those of an optimized venturi.

3. The Radial Turbines

The diagrams found in FIG. 4 illustrate turbines sized such that the maximum height of each stage is equal as well as the minimum height of each stage; however, this is not required. The stage height relationship in this specific example uses a 1.5 to 1 ratio of maximum height to minimum height; however, other ratios can be used. Meeting the requirements of having a constant hydraulic radius and specified heights involves a tuning task that is described more fully in the turbine section set forth below. These stages can be tuned to have matching bending stage RPM values throughout the entire operational range; however, this is not required.

Figure 5:
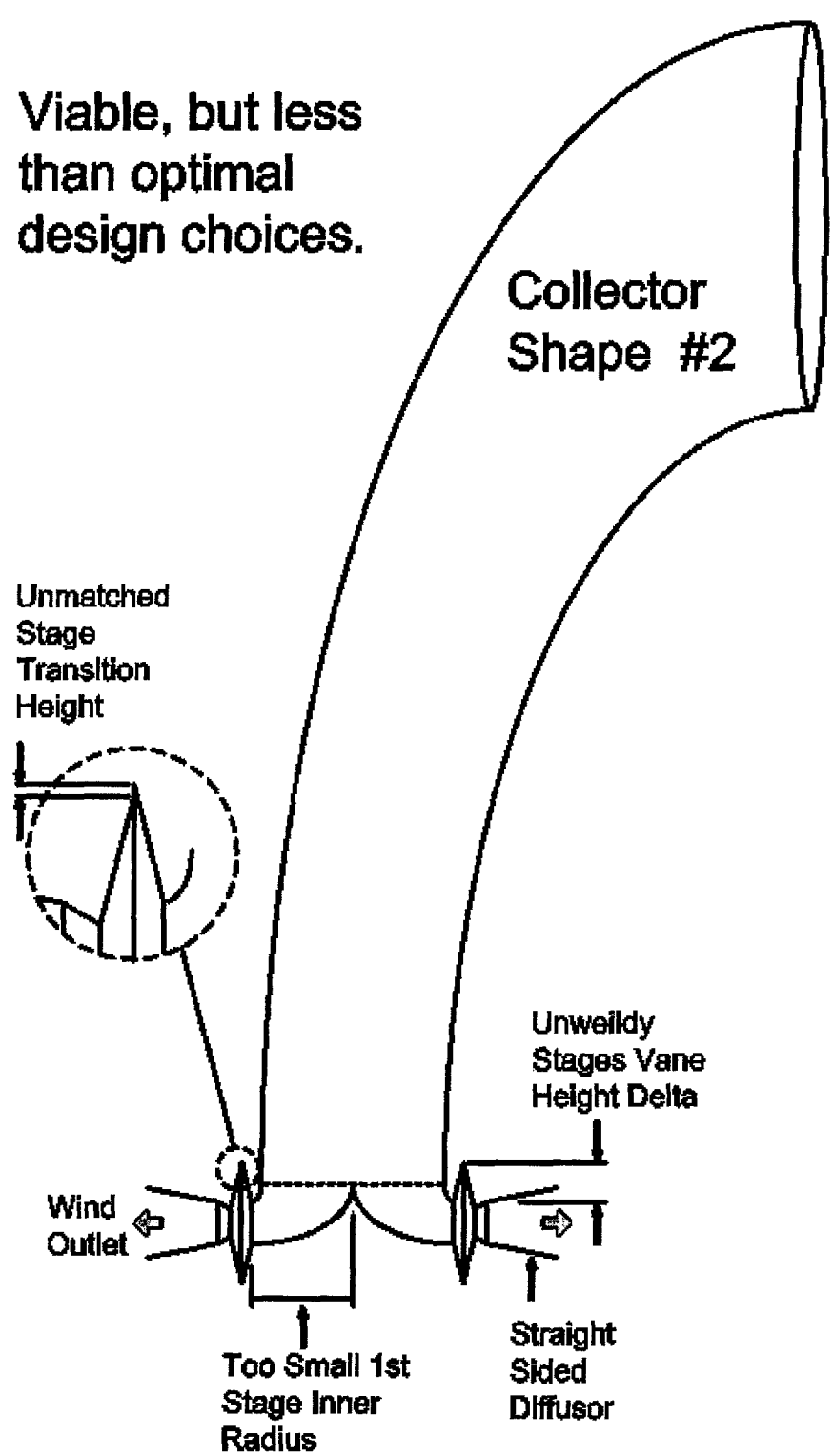
FIG. 5 is a diagram that illustrates turbine stage height relationships wherein the maximum and minimum heights have been treated as variables used to maximize performance without consideration to the vertical expansion rate and the smoothness of flow from stage-to-stage.

The illustration in FIG. 5 emphasizes turbine stage height relationships wherein the maximum and minimum heights have been treated as variables used to maximize performance without consideration to the vertical expansion rate and the smoothness of flow from stage-to-stage. The step change in height between stages is modeled as a flow restriction orifice. Here a constant ratio of 1.1 to 1 of the stage outer radius to inner radius was maintained; however, other ratios can be used. Thus, the horizontal ring width of the stages varies as a function of stage diameter. Optimizing to performance only, without regard to physical heights, can lead to some unwieldy and impractical configurations where the maximum height is more than double that of the previous example.

The FIG. 5 illustration shows that the bulk fluid model without physical constraints can converge to stage vane height delta values that can be unwieldy. This vane height delta is representative of the maximum amount of energy the fluid stream is capable of transferring to the rotating turbine. The heights for this example were obtained by equating loss of fluid momentum (e.g., stream velocity reduction) to the work performed while maximizing the later quantity. One non-limiting method of specifying the design is to constrain or force physical geometric limits as part of the optimization task. For example, matching maximum height and matching minimum height across all stages with a 1.5 to 1 ratio of maximum height to minimum height can be used as a starting point; however, this is not required. Optimization of this "squash" ratio may require a combination of computational fluid dynamics and pilot scale performance measurements. Full sized production unit performance can be evaluated to confirm the accuracy of bulk fluid modeling, advanced modeling, and piloting studies.

Secondly, the unmatched outlet to following stage inlet heights can be undesirable as it introduces an additional source of pressure loss. Even though the bulk fluid model includes the effects of the step change in height between stages, the unconstrained optimization may be qualitatively inferior to a design that uses the smoothest possible transition between stages.

Finally, as the wind speed changes, the RPM ratio between the two bending stages for both the constrained and the unconstrained design appears to follow a near perfect linear relationship. This linearity can allow constant ratio gearing to be used to couple stages that rotate independently. The design can be further optimized to have the RPM values matched across the entire operational range and mount like functioning stages onto a common platform; however, this is not required. The usage of a common platform that reduces the design's mechanical complexity can be advantageous.

During simulation studies and optimization tuning, a particularly important validation of the radial design was observed by keeping the outer to inner stage ratios constant and optimizing the first stage inner diameter for peak power output. Thus, the single-cone distributor outer diameter, the inner and outer radii of all turbine stages and the dimensions of the diffuser are spanned in a cohesive relationship while plotting the power produced. The optimized result produces a configuration where the innermost turbine rotational speed is actually less than the outer bending stage's rotational speed. This reduced speed is a result of the first stage sacrificing its optimal diameter for the overall combined performance of all stages. Even at the accelerated fluid speed as produced by the collector's reduced outlet area, the optimal diameter is in the purely radial regime. It is not transitional and certainly far removed from axial flow.

Generally, the most efficient radial turbine arrangement for power generating applications is having the feed to the first stage flowing radially outward; thus, the first stage is the one that bends the stream such that the stream has a tangential velocity component upon exiting the first stage; however, this is not required. It is possible to condition the stream prior to the first stage by adding a stator to impart a tangential velocity component and thus the corresponding first rotating stage would be a straightening stage; however, only a very peculiar type of application would require such an arrangement and such configuration may not be desirable. Therefore, the first turbine stage is generally not constrained to only being a bending stage, but mechanical efficiency concerns strongly push the design towards having the first stage as a bending stage. The functional purpose of the stages should alternate between bending and straightening; however, this is not required. For example, the placement of two stages adjacent to each other that both bend the stream away from a radial flow direction would in affect perform the same task as a single stage which used vanes with greater curvature. Bending stages generally have greater curvature, are generally more efficient, and generally capture a greater amount of the wind energy than straightening stages. There are several dimensional parameters that can be optimized for each stage. These parameters include, but are not limited to, the stage depth or difference between inner and outer radii, the vane count, the curvature of the vanes, and the height profile. The current model simulates the primary wind to mechanical energy mechanism using segmental analysis; however, other types of modeling can be used. Each vane's concave side acts as the direct impact side that bends or straightens the fluid stream. The vane's convex side is generally the containment side (see FIG. 13). The current simulation and computer modeling utilizes momentum relationships, bulk fluid flow pressure drop calculations, and rectangular cross section turbine passageways; however, this is not required. The turbine passageways have been simulated by dividing up each passage into segments and calculating center of mass, angular measurements, flow, pressure drop, and work for each segment. The segments used in mathematical simulation are created using lines that divide the vane area into equally spaced lateral spans. The resulting segment is a truncated pie slice shape bound by the opposing convex and concave surfaces of adjacent vanes. The turbine's purpose is the conversion of force from the stream's change of momentum vector into rotational work. Recognized negative effects of the turbine include the parasitic friction between the rotating stage and the airspace surrounding the turbine and the negative work between the bending stage exiting segment and the same stage's outer perimeter. This negative work is a result of the stream being pushed by the containment vane beyond the zone where the impact vane is extracting power. The negative work amounts to approximately 2% of the positive work that is captured and is included as part of the bulk flow simulation.

The turbine flow pathway can potentially be improved by incorporating optimized vane height profiles and/or the use of baffles to minimize secondary flow effects within the turbine. An expected additional benefit of profile enhancement and usage of baffles is that the vanes can become structurally stiffer. Increased stiffness can help reduce the level of mechanical strain on the rotating assembly and allow higher operational rotating speed. Entry and exit vane profiles of both stage types can be a narrow, vertical, and/or slightly rounded knife-edged shape to minimize the pressure drop associated with stage-to-stage flow transfer; however, this is not required. Non-rectangular turbine cross section profiles can be achieved by a gradual rounding of the rectangular corners beginning at the stage entrance combined with a gradual squaring-up of the rounding such that rectangular cross section is achieved at the stage exit.

Further enhanced control over the expansion outside the segmented zone can be achieved by adjustment of the containment wall thickness. The location of increased thickness of the containment vane for control of expansion can also provide a possibly desirable location for adding between vane wall structural stiffening.

Each application's optimization generally requires careful thermodynamic modeling. The choice of the best thermodynamic model is generally dependent upon the energy content of the feed stream. For streams with relatively low energy content (such as wind), the pressure drop is the dominating parameter and the model of choice is generally one that maintains constant hydraulic radius along the flow path within each individual stage. The varying vane count, radii, and other geometric quantities between the stages almost always demands that the fully optimized design also have different stage-to-stage values of hydraulic diameter. Applications utilizing higher energy content streams may benefit by profiles that aim to minimize entropy change or other thermodynamic objectives. All of the models may benefit from the usage of computational fluid dynamics.

Although the rectangular cross section bulk fluid model allows for a considerable amount of optimization, a more comprehensive understanding of the hydraulic radius effects may be gleaned from its definition, some simple examples set forth below, and the below discussion about the effects on turbine stage power output.

Hydraulic Radius Formula:

$$R_H = \frac{\text{cross sectional flow area (sq. feet)}}{\text{wetted perimeter (feet)}}$$

$$D = 4\ R_H\ \{\text{Equivalent Diameter}\}$$

Figure 6:
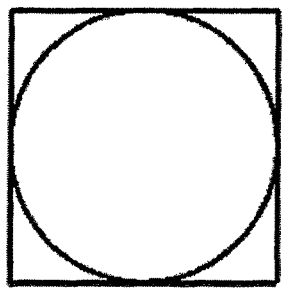
FIGS. 6 and 7 are diagrams that illustrate the benefit of rounding the corners in a collector.

With reference to FIG. 6, a square with one unit side length has the same hydraulic radius as a circle with unit diameter. However, the cross sectional area of the circle is obviously the lesser and thus the velocity through the circle for a given mass rate is faster. The residence time of a segment affects the power calculation through its mathematical influence by being in the denominator. Faster velocity and reduced cross section both decrease the residence time. A smaller denominator equates to a greater amount of power generation by having a lower $\Delta t$ (residence time).

Figure 7:
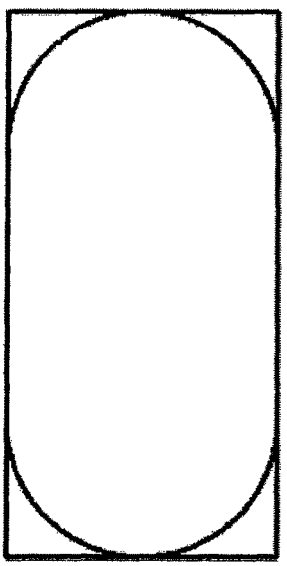

With reference to FIG. 7, further understanding of the benefit of rounding the corners is achieved by considering a rectangle with a height twice that of its width to an equally sized shape that has rounded corners.

The rounded corner shape has a larger equivalent diameter and thus a reduced pressure drop and greater mass flow rate is realized. The rounded corner's reduced cross section generally produces a greater velocity and reduced residence time. Again, rounded corners can lead to greater power production.

Figure 8:
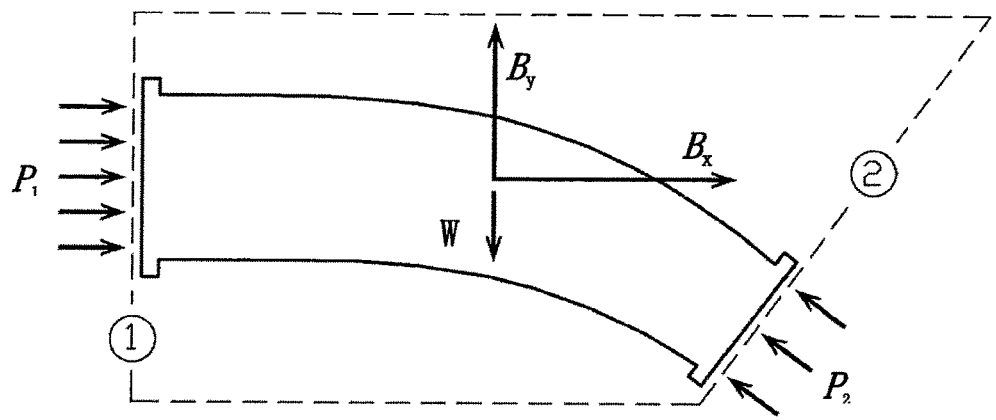
FIG. 8 is a diagram illustrating a control volume analysis of the forces generated by momentum vector analysis of a fluid flowing through a conduit with non-constant hydraulic diameter.

Calculation of the power produced is generally a three-step process:

1) Calculate the reactionary forces imparted on the vane from the motive fluid. An example of reactionary force analysis and resulting equations is found in FIG. 8 and is taken from "Fundamentals of Momentum, Heat, and Mass Transfer"; authors: Welty, Wicks, Wilson; ISBN 0-471-87497-3. The relationships between conserved forms of energy, non-conserved forms of energy, and Newton's second law are applicable in the analysis of the radial turbine.

2) Calculate the amount of work performed:

work=force*distance

The work calculation requires adjusting the two planer reactionary forces from step #1 such that their component contributions are aligned with the center of mass of the segment being analyzed and to that of a radial line that originates at the center of the circular turbine assembly. Also required is calculation of the distance the center of mass moves during the defined time span. The amount of work performed is also positively influenced by the rounding of corners that decreases the cross sectional area and volume of a segment.

The time span in seconds:

$\Delta t$=segment volume(cubic meters)*average density (kg per cubic meter)/mass rate(kg per second)

Distance is a function of the turbine's rotational speed:

Sweep angle(radians)=RPM/60*2*$Pi$*$\Delta t$

Radius: $r$=distance(meters) from rotational center to segment's center of mass

Distance=Sweep angle*$r$

3) Calculate the power produced which is the time rate of work done. Here, as well as in the previous step, residence time enters into the calculation. The previous mention of the advantages of using rounded corners is quantified in this power calculation step.

Power(Watts)=work/$\Delta t$

Vane Curvature

The layout of the curvature of the turbine vanes is accomplished by using a spiral equation. One such spiral equation makes use of convenient polar coordinates:

$r=ae^{b\theta}$

Figure 13:
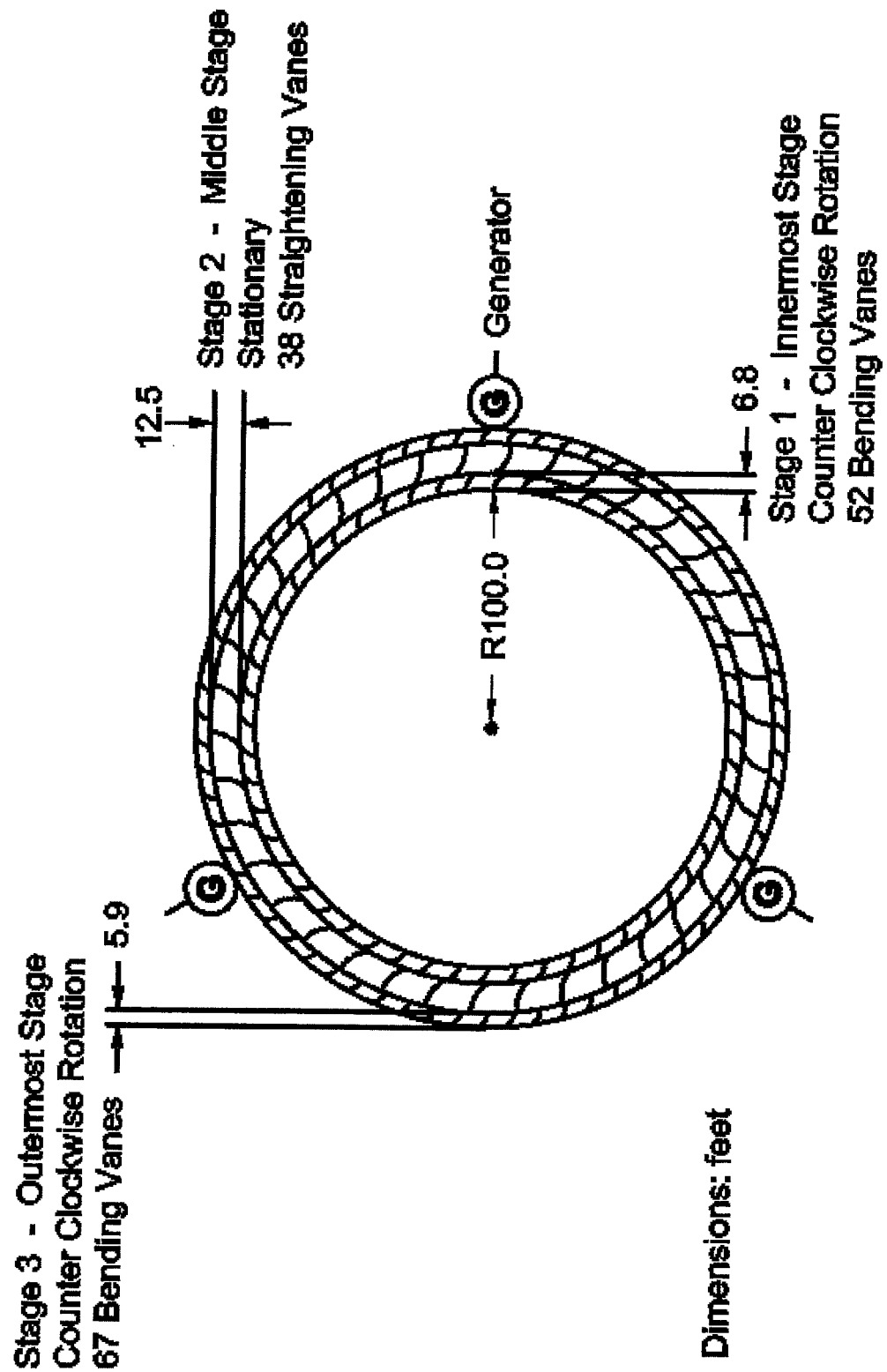
FIG. 13 is a scaled drawing example of a wind energy turbine configuration with three stages: two rotating/bending stages and one stationary/straightening stage.
Figure 14:
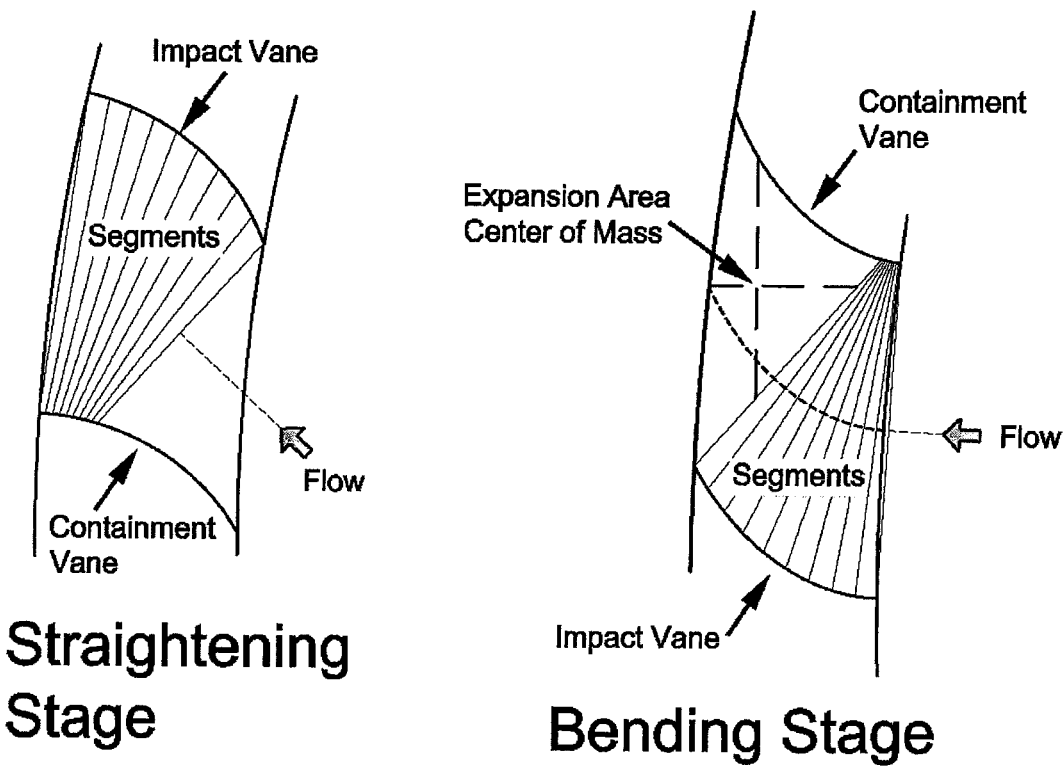
FIG. 14 illustrates the segments for both bending and straightening stages as well as the impact and containment sides of the vanes.
Figure 14:
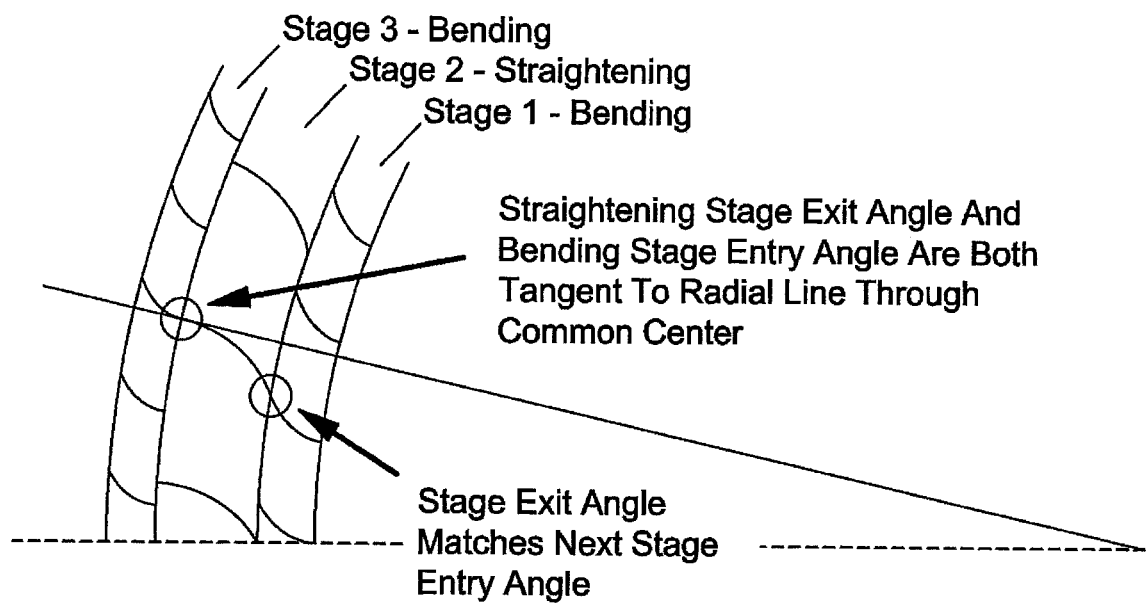

The careful specification of constants "a" and "b," the starting angle, the amount of angular curvature, and both x and y offsets from the origin leads to a perfectly behaved curve where both ends meet targeted angular values to that of a radial line from the common center and while simultaneously matching the inner and outer radii of the turbine stage. FIG. 13 illustrates proper vane curvature where the entrance of bending vanes and the exit of straightening vanes are aligned with a radial line originating in the common center of all stages. Additionally, FIG. 14 illustrates that a vane's exit angle for any particular stage should match the next encountered stage's vane's entry angle. Circular arcs or elliptical arcs may not provide sufficient control; however, by setting the "b" constant to zero, a circular arc is achieved. If the "b" constant is greater than zero, an increasing radius spiral is created. By choosing a negative "b" constant value, a decreasing radius spiral is achieved. The polar equation has been found to work properly. There may be steric limitations associated with the spiral curve. The vane count can also be an important part of the layout and an insufficient number of vanes can create geometric conflicts.

A Weibull distribution wind speed and the 1/7th power law have been used in the bulk flow computer simulation used for predicting performance of the proposed design. Accurate performance predictions are desirable to fairly evaluate the mobile applications that are discussed in more detail below. The 1/7th power law allows integration of the wind speed over the height of the collector's inlet. The power law provides the adjustment to wind speed for heights other than the measurement height which is typically about 30 to 50 meters; however, other heights can be used. Current mathematical modeling places the desired number of stages at about three for the energy from wind application; however, this is not required. The increased pressure drop caused by adding stages beyond the optimal produces a greater collector rejection rate that results in an actual decrease in overall power that can be achieved.

The turbine bending stages are expected to be mounted upon a supporting framework that is suspended and allowed to rotate; however, this is not required. The supporting framework may be incorporated into the turbine stage design itself and is not necessarily a separate entity. There are at least three possible options to suspend the platform; however, each manufacturer will need to evaluate all options and choose a method of suspension that best suits their specific design objectives. As previously mentioned, the stages can be independent and rotate at different speeds or they may have their geometry carefully matched such that their rotational speeds are also matched which allows a single rotating platform to be used for multiple stages. The reduced mechanical complexity and added rigidity resulting from usage of a single platform makes the usage of matched RPM stages potentially desirable.

Suspension Method #1:

The platform incorporates on its underside a circular rail with either rounded or tapered contours that are used as a contact surface with rollers that are mounted in a fixed location. The rollers can be grooved or shaped to receive and cradle the circular rail. This is one of the simpler design choices. The load on the bearings in the roller hubs is generally greater than that of method #2.

Suspension Method #2:

The platform incorporates an underside circular rail similar to that of method #1; however, here the rollers ride on a second circular rail that is positioned and fixed in place under the rotating framework. The fixed rail is of different diameter than that of the platform such that there is an angle to the vertical through the rollers' centrally located bearings. This angle or tilt of the rollers provides for a self-centering action where the weight of the turbine assembly maintains its lateral position. The roller bearings can be connected to rigid spacers that maintain equal roller spacing. One pair of rollers can be left without an interconnecting spacer to allow for slight expansion with changing temperature; however, this is not required. The load on the bearings can be greatly reduced as compared to Method #1. The bearing load can be reduced to only that needed to maintain spacing.

Suspension Method #3:

Usage of linear motors. A roller assembly such as Method #1 or Method #2 can be used. At speed, the linear motor lifts the rotor assembly such that roller contact is broken. This magnetic levitation is analogous to high speed train operation. The linear motor also serves as the generator and eliminates the need for geared transmission of force from the turbine assembly to the stationary generator(s). This option should be the quietest; however, even the roller suspended methods are not expected to create unreasonable amounts of noise. Current state-of-art linear motors generally are not as efficient as highly optimized conventional generators housed in cylindrical framework. This suspension method is worthy of consideration as it would reduce long-term maintenance tasks on rollers and roller bearings; plus the linear motor generator design has no mechanical ball or roller bearings as well.

The mechanical transfer of power from turbine stages to generator(s) can be accomplished in several ways. One non-limiting method is through the use of a large segmented ring gear mounted to the undercarriage of each rotating assembly. If independently rotating stages are being used, transfer or idler gears can be used to transmit power from one stage to another. In one non-limiting design, the use of three or more equally spaced generators allows the radial gear force vectors to cancel out and maintain the rotating assembly in a centered position (see FIG. 12). The choice of gear tooth pattern and the reactionary forces needs careful consideration. The straight cut gear pattern can be used for efficiency and its pure radial reactionary force that avoids the non-straight cut (e.g. helical cut gear pattern) gearing axial reactionary force that can lift the turbine. No gear slap noise as a result of gear backlash is anticipated due to the generator(s) providing a continuous, although fluctuating, source of resistance. Optional hold-down rollers can be used. The hold-down rollers, when used, can be frame mounted and be positioned immediately above a suitable surface of the rotating assembly; however, this is not required. The hold-down rollers can be used as insurance against the rotating assembly lifting in the event of an earthquake or unforeseen reactionary forces that may only become apparent at the higher operational speeds. The proposed design is expected to have exceptionally low sound level of operation due to the smooth and gradual slowing and expansion of the captured wind stream. However, it should be noted that attention to gear and bearing noise and its transfer through the turbines should be considered. The mostly increasing flow path cross section after the diffuser inlet might have a megaphone-like behavior. Reasonable usage of sound-dampening elastomeric rubber isolation between turbine and ring gear should produce very low sound emissions. Additional sound reduction can be achieved using sound absorbing curtains in the wheel house (the area where the turbines are mounted) as well as sound dampening material applied to the outer surface of the floor of the turbines. The expectation is that sound levels of operation may be well received by the public and no low frequency noise that plagues the axial flow propeller designs is expected. Routine sound measurement and analysis should be part of normal operational procedures as any change in the sound profile might be indicative of a need for mechanical repair.

4. The Exhaust Diffuser

A component that can significantly impact the overall efficiency is the exhaust diffuser. The bulk flow simulation model used in the development of one non-limiting design of the present invention uses a pair of parallel disks to approximate the performance of an optimized bell shaped radial diffuser. The diffuser pressure drop is adjusted by increasing and decreasing its outer diameter. These changes in diameter affect the exiting cross sectional area and the contained stream's exit velocity. A more advanced bell shape is expected to further enhance performance; however, other shapes can be used.

5. The Shroud

Figure 9:
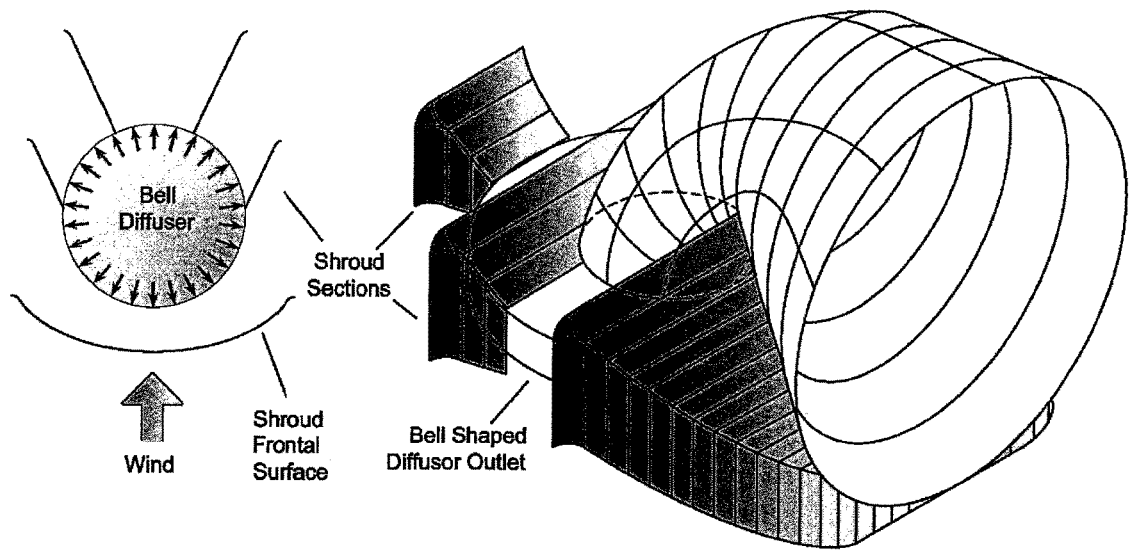
FIG. 9 is a diagram that illustrates the concept of a shroud that is used as a partial wrap-around shield to inhibit or prevent wind at near grade level from interfering with the diffuser's upstream side radial discharge. The shroud also allows the control and optimization of negative gauge pressure draft at the turbines/diffuser discharge.

The shroud can be a partial wrap-around shield that inhibits or prevents wind at near grade level from interfering with the diffuser's upstream side radial discharge. The shroud also can include multiple sections that each help scavenge away the discharge stream. One such shroud is illustrated in FIG. 9. The shroud's shape and size can be optimized using CFD; however, this is not required. A simplified visualization of the shroud is to think along the lines of a shape reflecting the front half of a racing bicyclist's helmet or a pair of streamlined sunglasses worn by athletes. The shroud can be attached to the assembly that supports and allows rotation of the collector. Thus the shroud alignment can be maintained in relationship to the collector's inlet.

Figure 11:
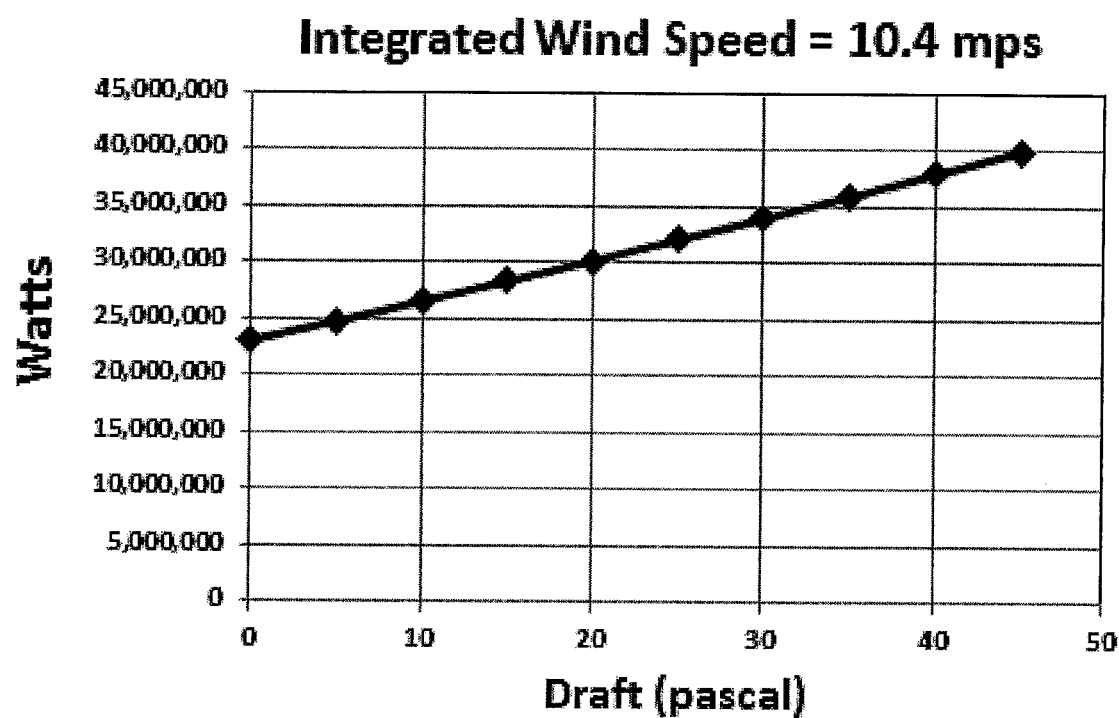
FIG. 11 is a graph that illustrates the benefit made possible by a downstream negative gauge pressure draft on an example wind energy configuration.

The shroud can also enhance and control the downstream pressure reduction or draft that is created by wind flowing around an object. Negative gauge pressure draft can have a dramatic effect on the quantity of power produced. The relationship of power to draft is generally linearly behaved. FIG. 11 provides a graph that illustrates the effects of draft pressure on the amount of electrical power produced.

6. The Generator(s)

The manufacturer generally specifies the number, orientation, location, and capacity of generators utilized to convert the captured mechanical energy into electricity. In one non-limiting configuration is the usage of three vertical axis generators equally spaced around the perimeter of the rotating assembly with the highest tip speed; however, other configurations and/or numbers of generators can be used. The radial designed wind energy layout provides great flexibility of generator combinations. The degree of this flexibility generally is not realized in axial designed wind turbines. Cable winding is also not an issue with the radial design because the generators can be fixed in place and need not rotate with changing wind direction. Maintenance, servicing, and installation tasks are all made significantly easier as compared to tower mounted axial flow equipment designs that place the generator(s) in confined nacelles located high above grade. These same advantages are realized in conjunction with Suspension Method #3 as previously discussed.

Performance Prediction and Computer Simulation

Figure 10:
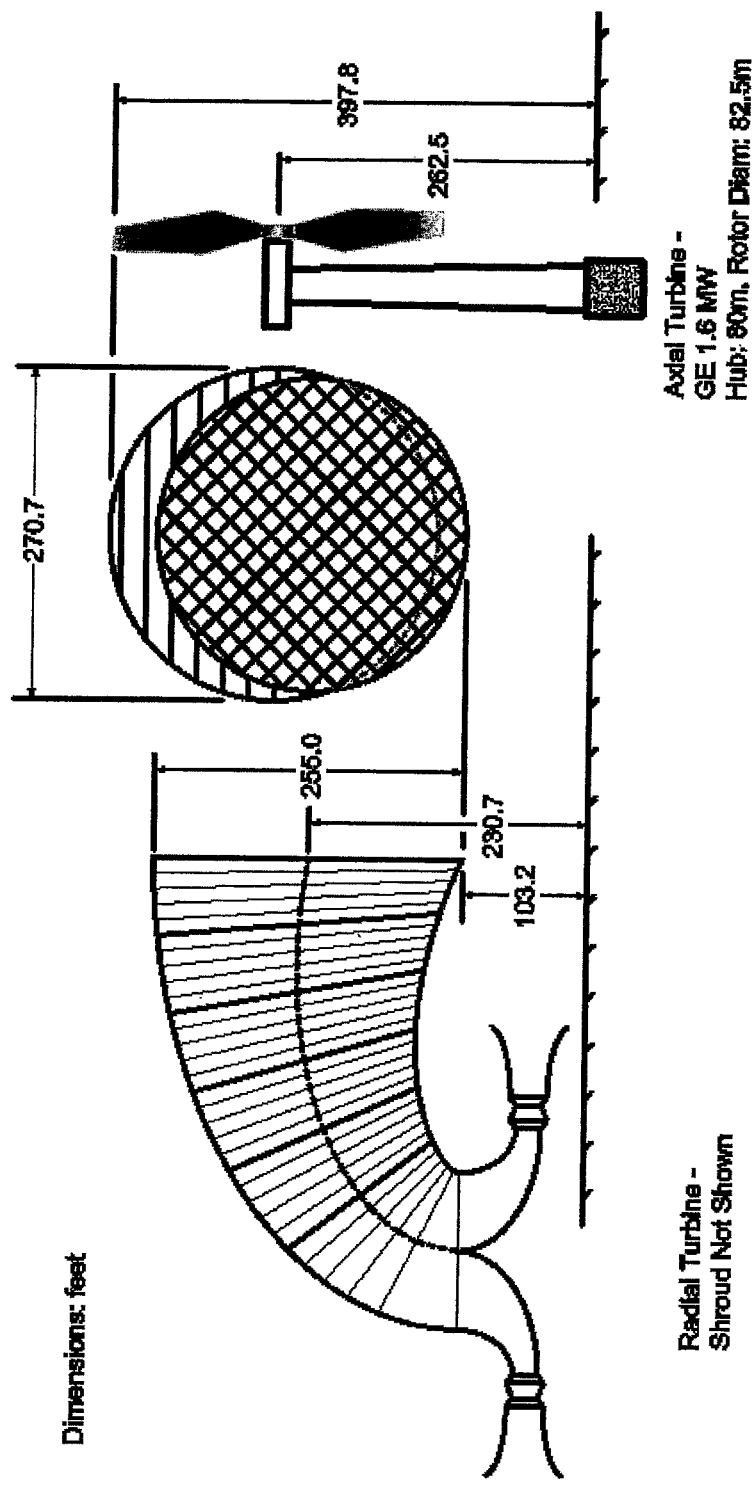
FIG. 10 is a diagram that illustrates a non-limiting radial wind turbine design in accordance with the present invention as compared to a conventional, axial flow wind turbine system.

The description of the invention to this point is aimed at introducing the principal components of the radial wind turbine design where the entire structure is stationary. Some non-limiting new and exciting applications can involve having the radial turbine mounted on land based vehicles or waterborne vessels. To enable performance predictions of the mobile configurations, the performance of a stationary design is generally established as a reference point. The following simulated performance is believed to represent a conservative, below realized expectation. The conservative estimate is used to discuss mobile applications so as not to exaggerate their expected performance. Any performance values which are inclusive of an estimated negative or positive contributor will have the contributor(s) specifically itemized. One non-limiting configuration of the design is illustrated in FIG. 10 and compared against a conventional, propeller style wind turbine. The propeller's diameter and the diameter of the collector inlet are illustrated as being similar for this non-limiting example.

Both equipment cost estimates and performance data are desirable to properly size the generators and determine the operational capacity. The mobile applications, yet to be discussed, generally require quantification of the expected performance to establish a basis or reference point. Generator sizing is best based upon an economic analysis and typically not one of meeting a specific capacity factor, thus the usage of economic data is desirable to fairly size the generator(s) of the radial design and to determine the averaged expected output or capacity. Cost data and sources are as follows:

| | | | | Generator | | |
|---|---|---|---|---|---|---|
| | Rotor | Nacelle & Controls | Gearbox & Drive Train | & Power Electronics | Tower | Total |
| Component Cost % | 28.0% | 21.7% | 17.3% | 7.0% | 26.0% | 100.0% | http://www.windustry.org/resources/how-much-do-wind-turbines-cost
1.75 Million $ per MW installed
http://www.repp.org/articles/static/1/binaries/WindLocator.pdf

| Component | $/MW Installed |
|---|---|
| Generator & Power | 122,500 |
| All Other Hardware | 1,627,500 |

After a reasonable cost model is established, it is the shape of the ROI (return on investment) curve that is of primary importance for accurately sizing the generator capacity. The peak of the curve locates the optimal generator size while the magnitude of the ROI can be ignored while the focus is on feasibility of design and not that of making a business decision.

The non-limiting economic model used for analysis herein produces a generator capacity of about 40 MW and a capacity factor of about 0.3038. Axial designs have a typical capacity factor of about 0.34. The comparison unit has about a 1.6 MW rating. The axial flow comparison design thus produces an averaged expectation of about 0.544 MW. This value contrasts dramatically with the radial design averaged expectation of about 7.934 MW. The power from the radial design is estimated by the current bulk flow model to produce about 14.58 times that of an axial flow design. Also, the axial design used in this comparison has a slightly larger swept area as compared to the base case radial design's collector inlet.

The simulation results have been downgraded by 15% as a conservatively large estimate of the combined inefficiencies of the generators, mechanical gearing, and parasitic drag associated with the rotating turbines.

Advanced CFD is desirable to accurately predict the enhanced performance of internal baffling in the collector to minimize pressure drop effects caused by secondary flows, to predict the draft pressure an optimized shroud design can generate, and to fully explore non-symmetrical and non-rectangular cross sections in the turbine passageways. The following list identifies missing contributors that shall have a positive influence on expected performance.

Positive Contributors Missing from the Model:
1) An optimized shroud design that produces a negative draft pressure is expected to dramatically enhance performance.
2) The collector is the largest source of pressure drop through the entire system and significant improvement is expected by optimizing baffles that minimize the effects of secondary flow.
3) The usage of rounding corners and advanced turbine path optimization is expected to provide enhanced performance.
4) The bulk fluid flow equations are typically considered as conservative and overestimating of pressure drop.

Although the current bulk flow model does not accurately predict the amount of draft the shroud will produce, it does allow the draft to be specified and generate expected performance at that assumed condition. A plot of this output as illustrated in FIG. 11 shows that the presence of draft influences performance greatly on a system dominated by pressure drop. Additionally, any reductions of collector pressure drop through usage of baffling is expected to behave generally linearly and be of about equal magnitude effect as that of the draft effects. In other words, a 5 Pascal reduction in pressure drop through the collector is equivalent to about a 5 Pascal draft at the system outlet.

For example, at a wind speed of about 10.4 meters/second, the pressure at the collector inlet is approximately 105 Pascal. The collector pressure drop is approximately 72 Pascal. A 20% improved collector pressure drop combined with a draft of 20% of the inlet pressure produces an approximately 35 Pascal pressure differential gain. It is reasonable to thus expect a performance improvement. Possibly a 40% or more improvement can be realized. However, estimated performance graphs and values used in this patent application reflect the base case without the effects of fully optimized collector, vane profiles, and shroud.

Collector Positioning

Figure 12:
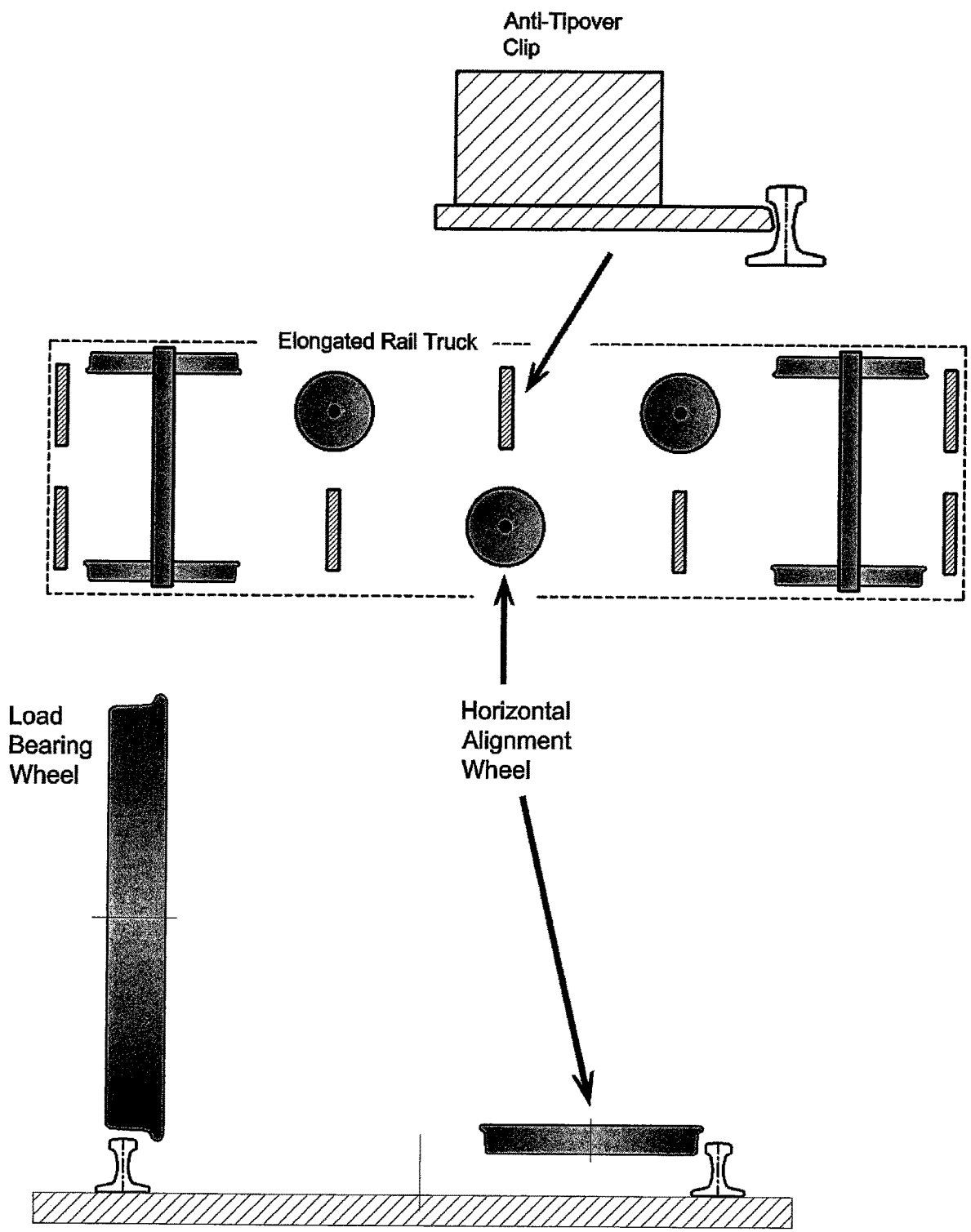
FIG. 12 illustrates a non-limiting and modified rail truck system in accordance with the present invention. This truck system may be used to support and allow positioning into the wind collectors used in large, commercial scaled wind energy configurations.

The large size of the collector that rotates into the wind and maintains alignment with the distributor, turbines, and diffuser can provide unique challenges. To accomplish this task and maintain precise alignment, an installation of a rail system may be used. One non-limiting rail system is illustrated in FIG. 12. Train or crane rails have a range of profiles and linear weights that correlate to their load carrying capacity. The overall weight of the collector and its supporting space frame will generally determine the best choice of rail. Some modification upon conventional twin-axel four-wheeled rail trucks may provide sufficient carrying capacity and positioning capabilities. Additional rollers may be needed to align the truck horizontally upon the concentric circular rails. These rollers can be used to replace the wheel flanges as the control over the tapered wheel's profile point of contact with the rail. Matching inner and outer wheel contact points and wheel dimensions can allow for efficient solid axel utilization where a single axel revolution can cause each wheel to cover the same percentage of its respective total rail length. The outer wheel path covers the greater distance. Slight shimming of the axels may be used to align each to a common center of the circular track and reduce wheel-to-track contact slip to a minimum for this specialized service where the only direction of travel is circular. The truck design can be further modified through elongation. This design can achieve greater distribution of load bearing contact with the space frame and allows the tip-over clips (as discussed below) to spread their occasional loads over a longer length of rail.

The structural design wind speed can include tipping effects of the collector assembly. Even though the design provides for a wide base, the overall weight and center of gravity should be evaluated to assure tip-over does not occur, even in the event that control that maintains the collector facing directly into the wind is lost. Tipping at any wind angle for the design speed is generally to be avoided or controlled. The adding of ballast can be considered to increase the wind speed at tip-over rating; however, other options can be used. For example, stoutly mounted and adjustable retaining clips that only make contact with the rail upon tipping initiation can be used. These clips shown in FIG. 11 can be used to maintain a minimal clearance from the rails during normal operation. The clips could utilize rollers to make rail contact; however, the collector assembly is not expected to be rotated during a rare storm-induced tipping event. Thus, the clips can be profiled to match the underside of the rail head to maximize contact area. The rails can be secured sufficiently to counter the upward stress encountered during a tip-over event. A non-ballast rail system can be used and a base that allows the rails to be connected (e.g., skip-welded) in place. The number of clips, their spacing, and the amount of welding needed to accomplish the design objectives is variable and specified according to the design's wind speed. Conventional rail retaining clips may suffice without the need for welding, and possibly no tip-over constraint may be used to meet the design objectives.

Secondary Flow and Additional Turbine Discussion

Turbulence and secondary flows in streams of fluids represent lost energy and, when possible, should be minimized. In addition to the radial design taking advantage of the natural volumetric expansion with increasing diameter; there are also localized and undesirable volumetric expansions at the exit of bending stages and the entrance of straightening stages when the stages are defined by a simple constant wall thickness vane. A fully optimized design may require vane shapes that are more complicated than having a constant thickness wall with precisely specified curvature and height profile. Economic considerations may supersede the usage of complex vane shapes.

A square shaped stage entrance and exit is one non-limiting shape; however, a square shape is generally not encountered along the flow path. Optimization can include finding the best vane count per stage. As vane count is increased, a desirable increase in the effective bend angle is generally realized. Countering the improved bend angle is an increased pressure drop from increasingly greater deviation from the ideal square shape. As the rectangular width-to-height ratio deviates further from the square 1:1 ratio, the decreased hydraulic equivalent diameter results in increased pressure drop. Any pressure drop increase results in less mass flow rate from which to extract energy.

The dimensions and vane counts of a non-limiting and matched set of stages shown in FIG. 13 are representative of the base case collector dimensions. The radial design scales nicely; however, the precise geometry should be optimized for each specific application.

FIG. 14 illustrates the mathematical layout of segments used in the analysis of the radial turbine design. Calculation of the wind force on the vanes is analogous to calculating the force exerted upon a reducing pipe bend. To facilitate the calculation, ten equally spaced divisions were made along the impact side of the vane; however, this is not required. The vane's shape is described using a modified spiral equation that allows precise specification of the entrance slope, exit slope, entrance location, and exit location. The spiral equation is well behaved. It produces a smooth and continuous curve similar to a circle; however, the spiral has a continuously varying radius. A very narrow slice trapezoidal numerical integration method provides accurate volume and center of mass determination of each segment. Energy is being transferred from the stream all along the flow path within the divisions. The height profile of each stage is a direct consequence of the dominating characteristic of the system. For streams of low energy, the dominating characteristic is generally pressure drop and this is generally minimized by specifying constant hydraulic radius along each turbine flow path.

The straightening stage will typically be stationary and the segmental analysis is again used to assure the hydraulic radius is equal along the flow path.

Figure 15:
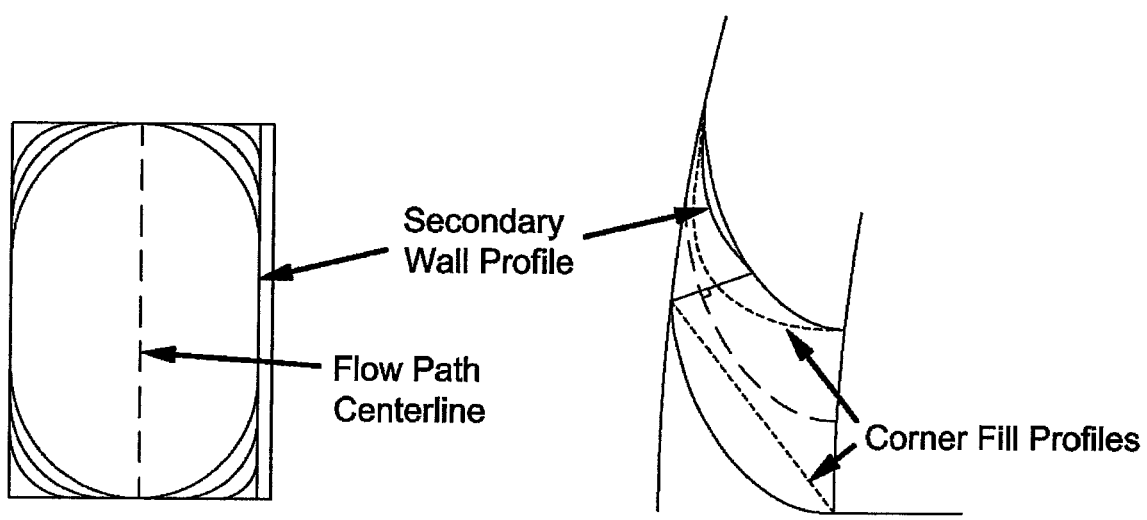
FIG. 15 illustrates an example of secondary wall and corner rounding profiles for a bending vane.

Two other recognized shape-tuning options to alleviate undesirable localized expansion and maintain stream velocity are corner rounding and using variable vane wall thickness or a secondary wall as illustrated in FIG. 15. Corner rounding has the benefit of transitioning towards a more efficient circular cross sectional shape. Thus the wetted perimeter is reduced, pressure drop is slightly reduced, and mass flow rate is slightly increased; while maintaining the stream's velocity and minimizing undesirable expansion between the last containment segment and the stage's outer periphery.

Within the segmented region of the turbine passageways, the corner fill profile is interpreted as a ratio of the distance from the vane surface to the opposing impact or containment vane. For example, when the profile and the centerline coincide, the quarter circle fill has a radius of half the distance between the vanes as measured congruent with the lines defining segment boundaries. Outside the region where a line cotangent to the centerline intersects the impact vane, the before mentioned interpretation loses validity. In the outer region, the combined effects of the corner fill profile and the secondary wall thickness become specified by distance from the convex containment vane. Although a secondary wall can be incorporated with the concave impact side of the vanes, this may not be desirable as it would alter the perfectly behaved spiral geometry of the impact surface.

The flow straightening turbine stages utilizing strictly rectangular cross sectional areas also can exhibit undesirable expansion. The straightening stages expansion occurs at the inlet as opposed to the outlet of bending stages. Again, utilization of a secondary wall and corner filling help minimize any undesired expansion. Controlling the expansion can effectively increase the equivalent hydraulic radius, reducing pressure drop, and/or maximizing mass throughput and/or internal stream velocity.

Residential or Small-Scale Wind Energy Capture

Figure 16:
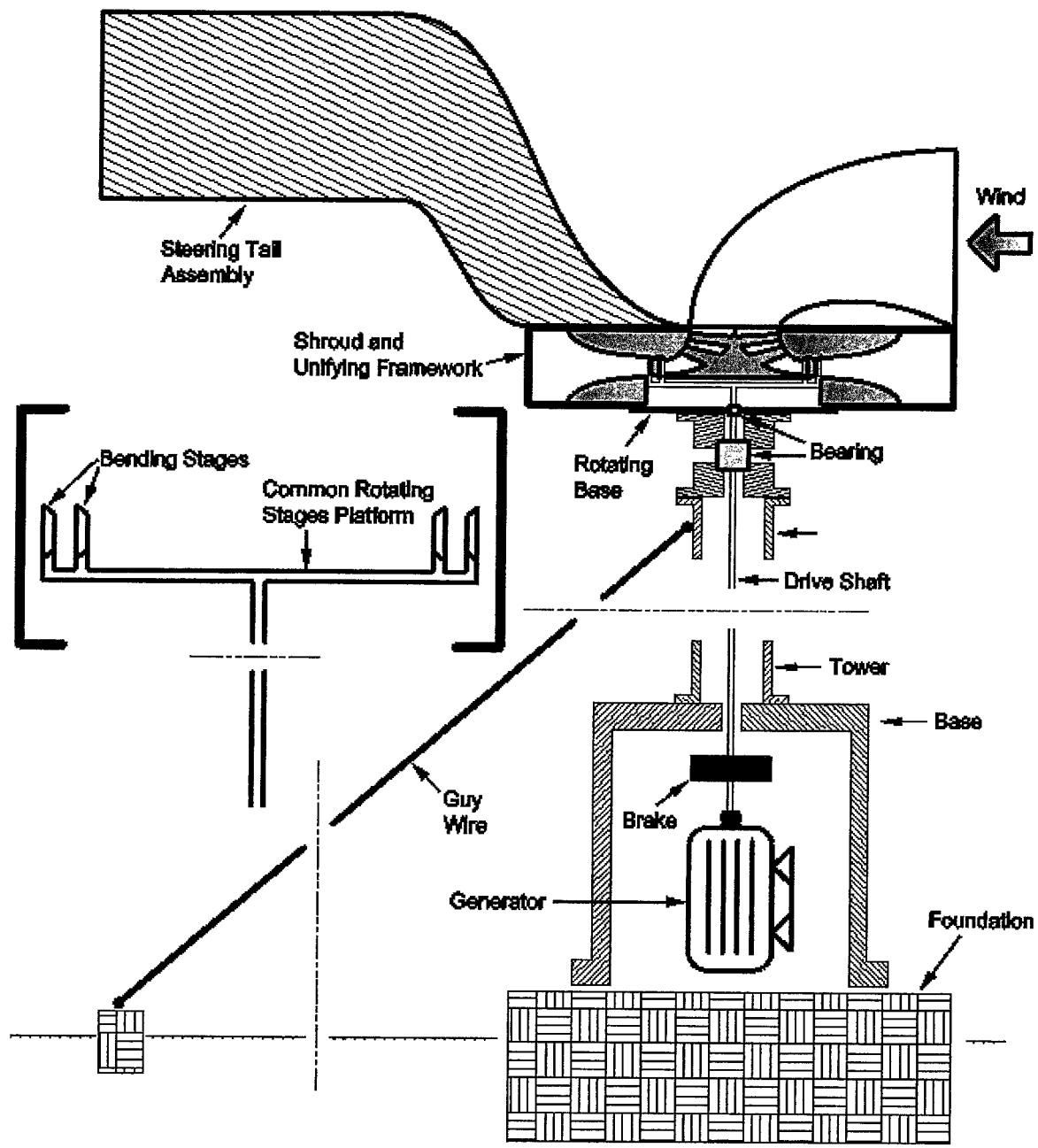
FIG. 16 illustrates a non-limiting residential or small-scale wind energy capture system with a 90° bend collector in accordance with the present invention.
Figure 17:
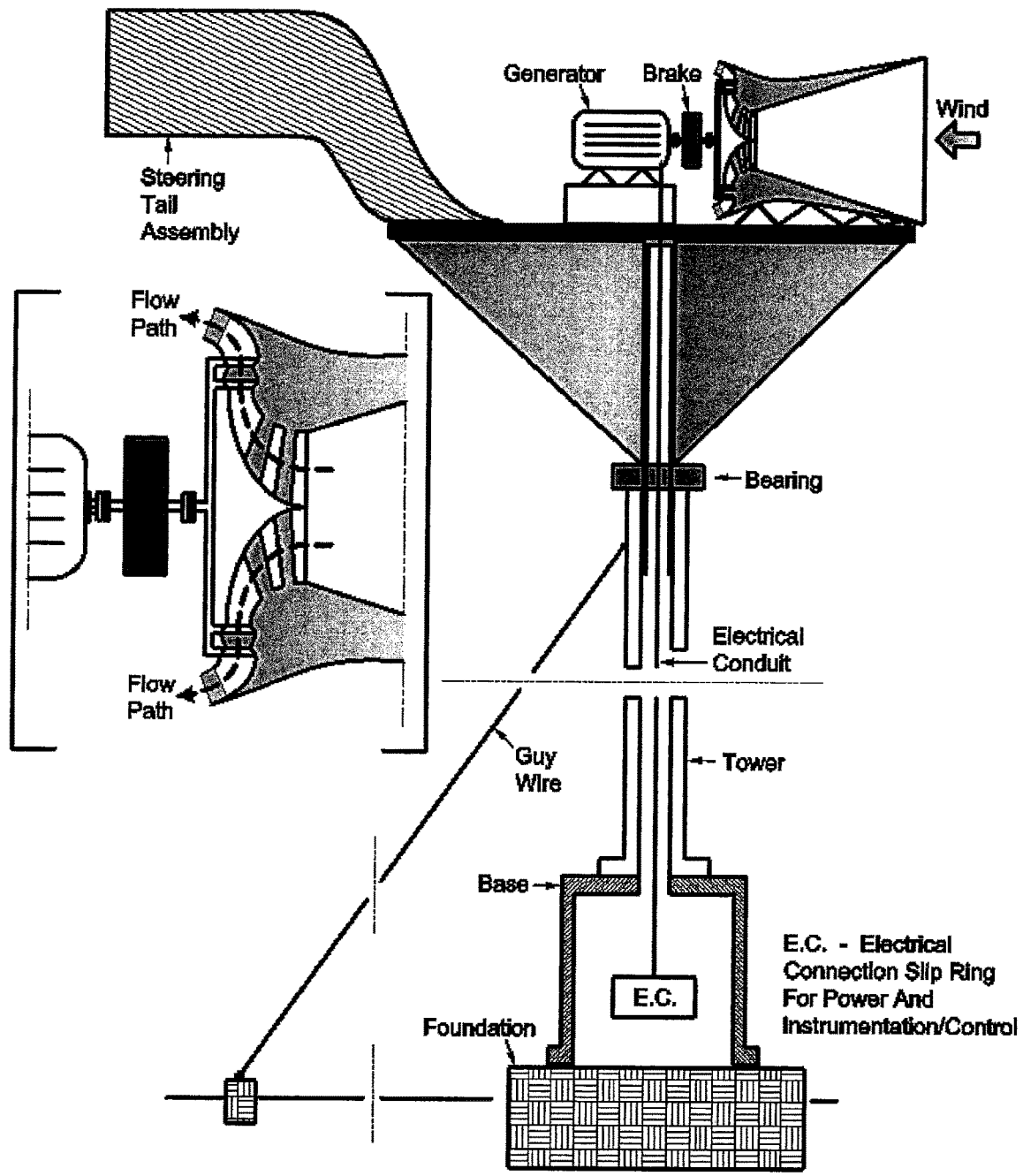
FIG. 17 illustrates a non-limiting wind energy capture system with a straight walled collector shape for small-scale applications.

The radial design is amenable for small-scale applications as well. These may include private residences or businesses located in favorably windy regions. Both collector Shape #1 with the generator mounted near grade as illustrated in FIG. 16 and the straight wall collector, Shape #3, as illustrated in FIG. 17 with an inline generator are feasible.

Collector Shape #1

A non-limiting wind energy system illustrated in FIG. 15 includes: the use of Shape #1 for the collector, a shroud, and unifying framework that provides the structure to unify or tie a majority of the mostly stationary components together. These components include: both upper and lower halves of the distributor, the diffuser, the straightening stage, the collector, and the tail assembly. Note that baffles can be used in this design within the single cone distributor to allow the lower half of the distributor to be fixed in place through the upper half that is directly frame mounted.

The necessary steering tail assembly configuration can be quite varied. It may consist of a twin tail configuration, a circular tail, a large single tail, or other shapes that serve the purpose of aligning the collector inlet into the wind. To maintain the collector facing into the wind's predominate or averaged direction of flow, a friction type bearing or viscous fluid dampener can be used to control any oscillatory behavior of the turbine assembly caused by the ever present instantaneous wind directional changes. Counterbalance weight should be considered to offset the tail assembly weight and maintain the center of gravity in line with the tower support bearing.

The small scale units can have control over the maximum internal wind velocity. This can be achieved by a single method or a combination of several methods. Among the choices for control are:

1) steer the collector inlet away from being directly in line with the wind through the usage of yaw type controls that use tail assembly position to achieve the offset angle required to keep internal wind velocity within specification;

2) use secondary flow control baffles within the collector that are designed to pivot and obstruct a portion of the flow;

3) design the vanes of the shroud to pivot and obstruct the flow on the discharge side of the turbines to create sufficient pressure drop to limit flow rates as needed;

4) use the brake to park the turbines during excessive wind events; and/or 5) oversize the generator such that generator load can keep turbine RPM within tolerance.

Each specific design should have the drive shaft properly sized. In addition to end bearings, bearings along the drive shaft length are expected. Particular drive shaft detail may also be needed for each design such that assembly and maintenance tasks are not made unduly difficult. Spline type couplings and tower access ports may be used.

The tail assembly and collector generally have a greater amount of allowable flexural tolerance than the stationary and rotating assemblies that combine to create the wind pathway downstream of the collector. There generally should not be excessive gaps between the turbine stages and during all wind conditions the individual turbine stages must not make contact with each other. Precise component alignment during both mating and separation tasks between the rotating turbine stages and the stationary stage(s) generally is maintained during the entire process to avoid damaging the turbines. Guide rods can be attached to the framework and allow tight tolerance bushings located in the turbine base plate to help maintain the alignment. Additional means beyond guide rods and bushings for keeping the turbine stages radially aligned and axially parallel during the assembly and disassembly tasks can be provided.

Straight Collector

Another non-limiting wind energy system illustrated in FIG. 16 utilizes collector Shape #3 along with a list of components the same as the previous example. The straight collector shape for small-scale applications can provide better overall flow characteristics and produce more power. However, the straight configuration is generally only practical for relatively low power capacity designs. As the size of the system is increased, horizontal flow turbines may become impractical. Large horizontal axis radial turbines can have difficulty providing adequate structural integrity for the turbines, can have rapidly increasing tower requirements, and/or can provide more difficult equipment access. The cable winding issues for small-scale units can be remedied by using a slip ring connection.

As with every radial turbine design, the tasks of assembly and disassembly require proper alignment to be maintained during the time the rotating and stationary assemblies are within close proximity to each other. The platform can be designed to provide a machined channel to facilitate these tasks. The channel, when used, can be designed to receive the bearing housing of the rotating turbine and allow it to be evenly slid into place or evenly extracted. Design considerations are needed to prevent rust, scale, and debris from insects from fouling the channel. A sufficiently long channel can allow a precisely machined push-block to contact the bearing housing and prevent turbine stage contact during these tasks.

The generator base can also use this channel and thus simplify generator-to-turbine hub alignment. Possibly, the generator base can serve as the above mentioned push-block; however, this is not required.

Any component alignment issues also extend to the framework that ties all the components together. The framework is a component that should withstand the full range of wind conditions without excessive flexing. The framework also should be robust enough to withstand handling during shipping and lifting onto and off the tower. Specifically, engineered lifting lugs and support cradles can be incorporated into the framework's specifications.

Mobile Applications

The greatly improved performance that the radial design provides for stationary wind energy applications can also be extended to mobile applications. Both power produced and power consumed by aerodynamic drag can increase with increasing speed. Of great interest is the observation that the power produced can outpace the drag induced losses. If a vehicle is fitted with a collector of sufficient size, there is a velocity at which the wind energy potentially matches the combined rolling resistance, the drag of the vehicle, and the drag of the wind device itself. Above this self-sustaining speed, excess power can potentially be produced which can be used to recharge batteries or be controlled through a throttling mechanism. If the vehicle is rail mounted, the excess power can be transferred to the electrical supply grid using either a 3rd rail mechanism or linear motors. A circular track arrangement would allow multiple, equally spaced vehicles to continually produce power. Capacity can be increased by track length with more vehicles and by adding multiple concentric circular tracks. The vehicles on odd numbered tracks can be designed to travel in opposite rotation of those on even numbered tracks to minimize following turbulence. The realized inlet speed might be less than the vehicle speed if air is being dragged along by the leading vehicle. More tightly spaced vehicles can be expected to have to travel faster to create a given amount of power compared to widely spaced vehicles.

Figure 19:
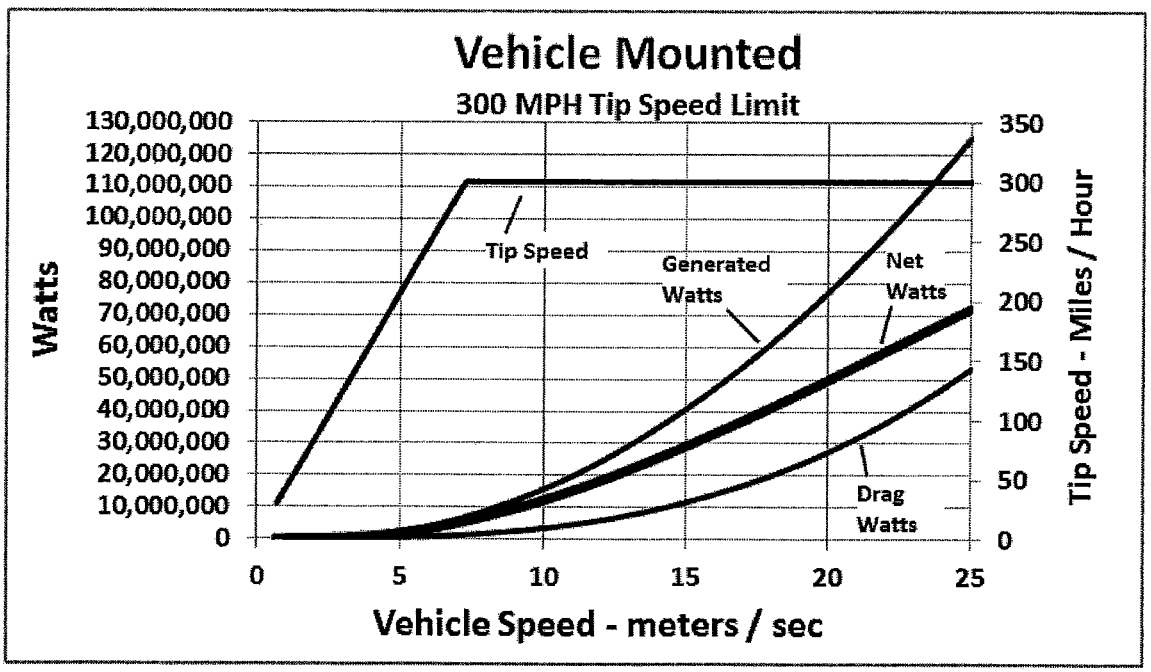
Figure 20:
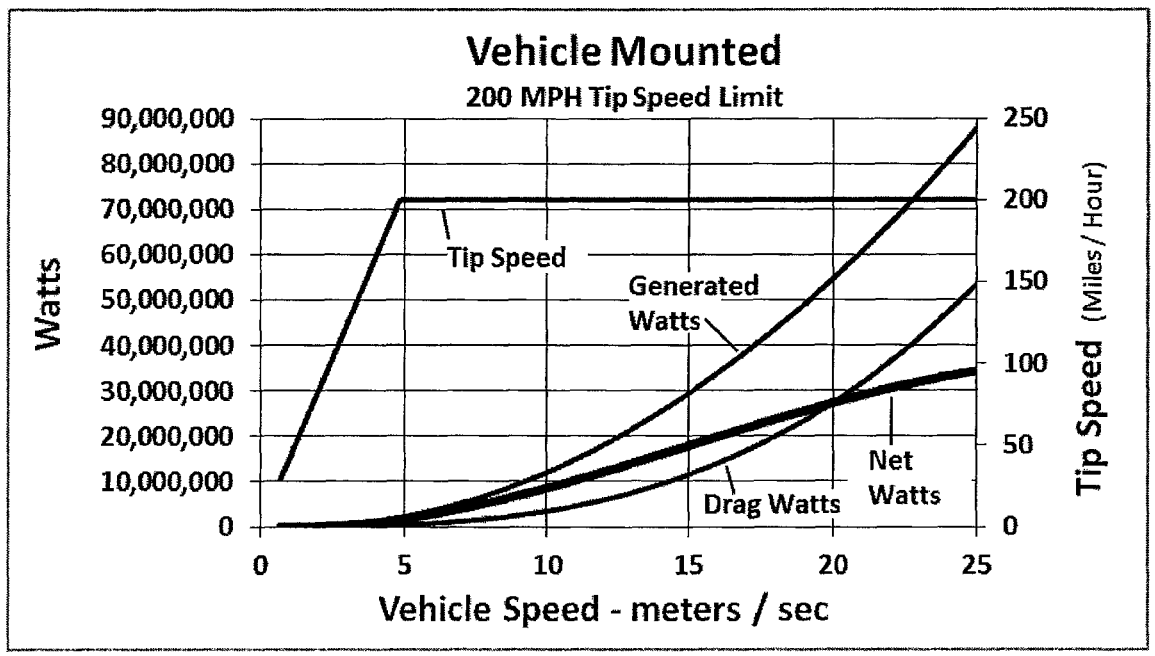

Values generally needed to calculate the combined aerodynamic drag and rolling resistance include air density, relative velocity of vehicle to air, drag coefficient, rolling resistance coefficient, cross sectional area, and the normal force of the vehicle to the surface.

$$F_D = \frac{1}{2}\rho v^2 C_D A$$
http://en.wikipedia.org/wiki/Drag_equation $$F = C_{rr}N$$
http://en.wikipedia.org/wiki/Rolling_resistance The rolling resistance should be included in the estimation; however, it is a small contributor and independent of speed. Thus, roughly approximated weights are sufficient for conceptual calculations and performance characteristics charts can be produced with reasonable accuracy. For the large, commercial scale base case design the charts found in FIGS. 18 through 20 illustrate expected performance.

Figure 18:
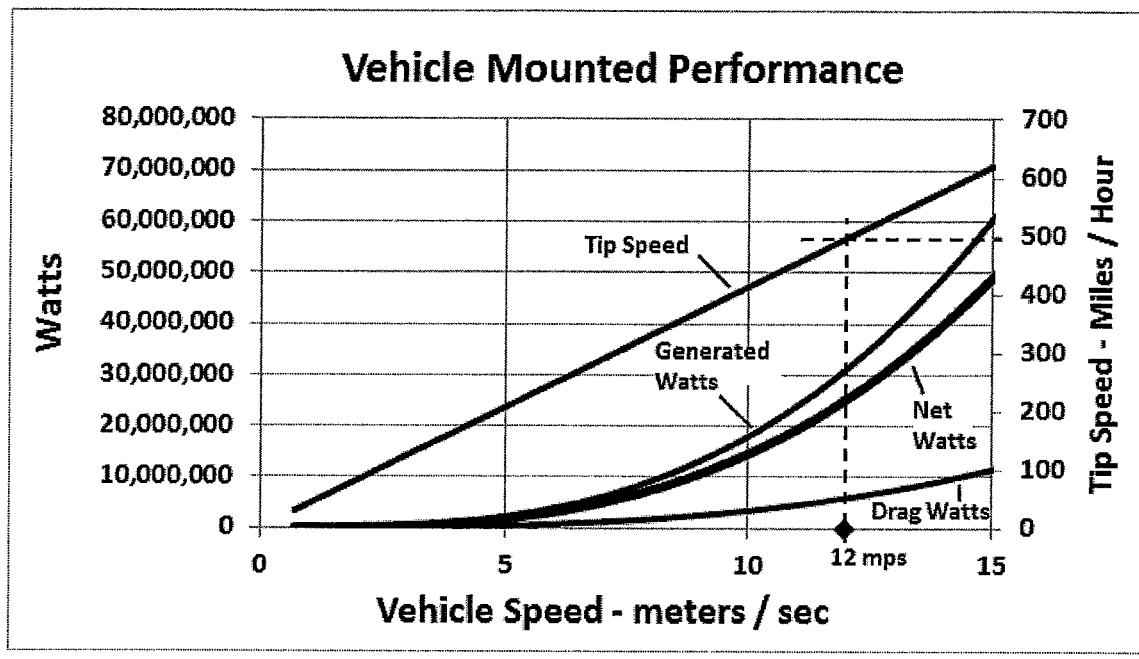
FIGS. 18-20 are graphs that illustrate power output for wheel-mounted wind energy capture systems. These performance graphs are based upon rectangular turbine cross sections.

The radial wind energy design is a very high performance machine as illustrated in FIG. 18. The base case design at a vehicular speed of about 12 meters/sec has the rotating turbines spinning at just over about 55 RPM with a tip speed of just under about 500 MPH. The chart in FIG. 18 includes a Tip Speed plot that is linearly behaved and where no upper limit constraint has been applied.

The radial design has great flexibility. For example, the generators can be sized up to maintain enough load on the turbine assembly to limit its rotational speed to a targeted maximum value. The graph illustrated in FIG. 19 represents a 300 MPH tip speed limitation and extends the plot out to 25 meters per second velocity.

The torque load on the turbines is significantly increased as vehicular speed increases. This additional torque must be factored into the design specification of the turbines with or without RPM limitations being imposed.

As illustrated in the graph of FIG. 20, further reduction of the RPM to limit tip speed to 200 MPH provides a sense for the difference of power versus maximum RPM at various vehicle speeds.

Clamping the RPM further to lower the maximum tip speed from 300 MPH to 200 MPH reduces the output at a vehicular speed of 25 meters per second from about 72.0 MW down to about 34.3 MW. Thus the importance of a design capable of highest tip speed is apparent as a one-third reduction in tip speed results in about a 52.4 percent reduction in power produced.

If the load the generator is providing is lost for any reason, a rapid runaway condition exists that may lead to RPM values exceeding design tolerance.

Redundant instrumentation is desired and emergency braking and wind stream diversion of all vehicles on the same track should occur simultaneously if any unit exceeds the design maximum RPM value. Maintaining an even following distance between all vehicles while suddenly slowing them to a stop may need computer control. Usage of g-meters as part of the control scheme should be considered along with accurate and fast responding axel rotation measurement.

Over-the-Road Vehicles

Nothing about the radial designs presented in this patent application are conventional and that certainly applies to the mobile design extended to over-the-road vehicles. Both personal transports and trucks are amenable to utilizing the mobile design previously discussed. The collector can be scaled down greatly and the speed at which self-sustained propulsion is achieved becomes greater. For large trucks, the self-sustained speed may never be realized; however, the wind energy may be used to supplement the primary engine and reduce fuel usage. Private vehicles might be equipped with battery capacity greater than that needed solely for vehicular needs. The excess capacity can be used to supplement power needs of the residence provided average driving frequency, speed, and distance justify the added cost associated with increased battery size. A collector design that retracts and reduces its opening area can be considered so that at highway speeds less throttling or air bypass is required. Thus reducing the collector's contribution to vehicular drag and reducing the demand on the generator.

Figure 21:
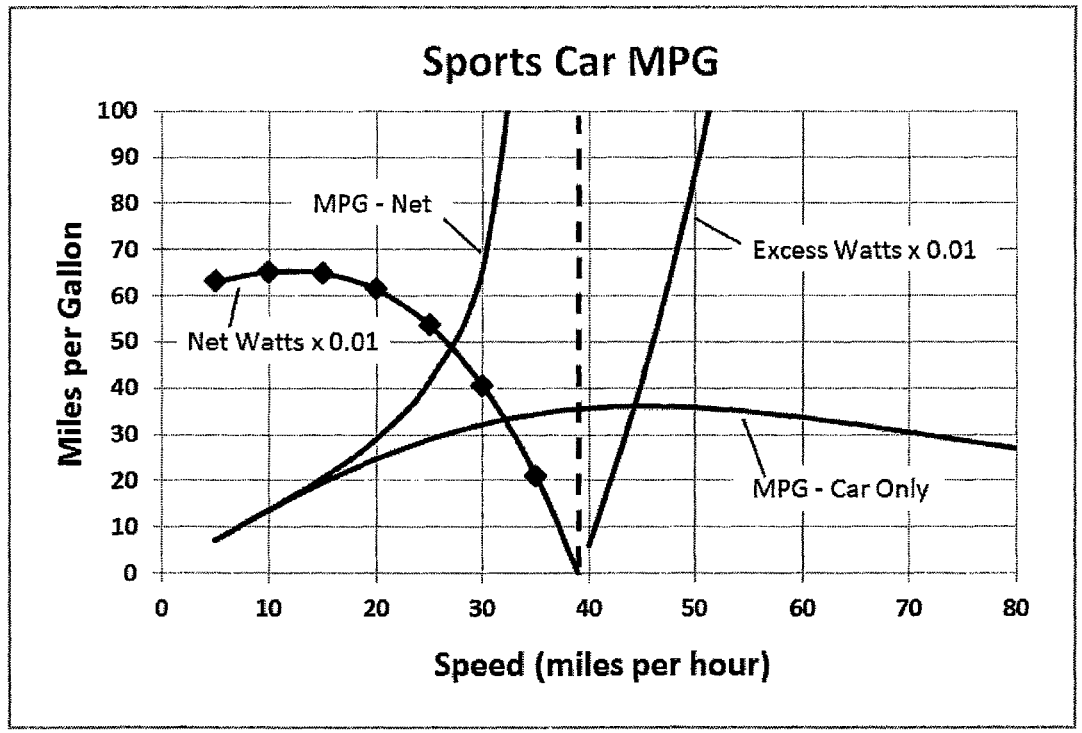
FIGS. 21-23 are graphs illustrating performance in miles per gallon and energy generation by wheel-mounted wind energy capture systems based on the speed of the vehicle. These performance graphs are based upon rectangular turbine cross sections.
Figure 22:
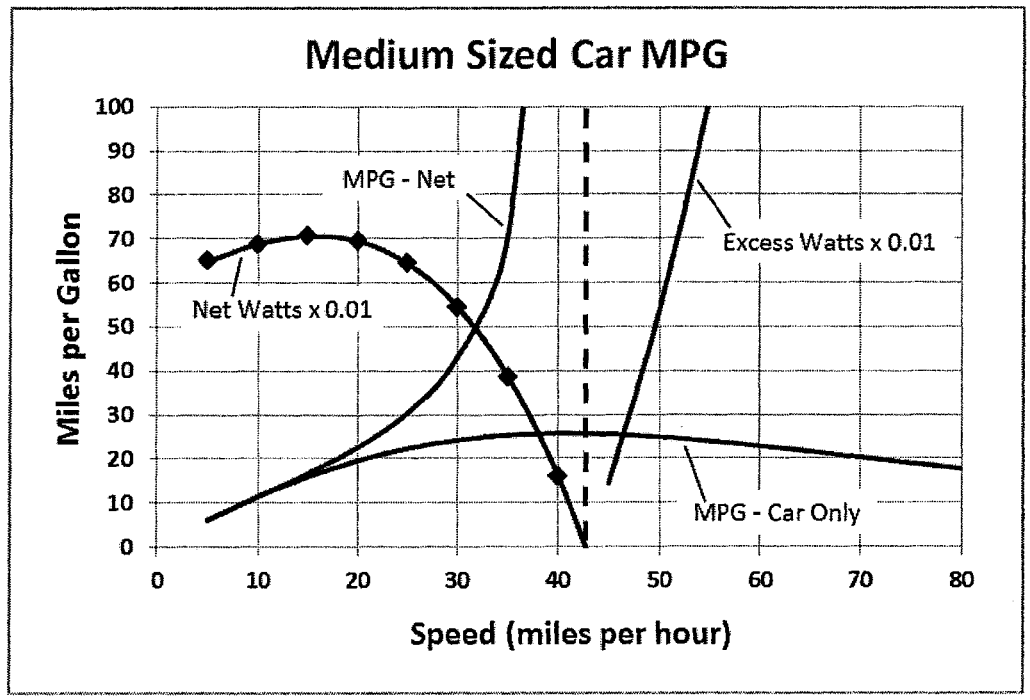
Figure 28:
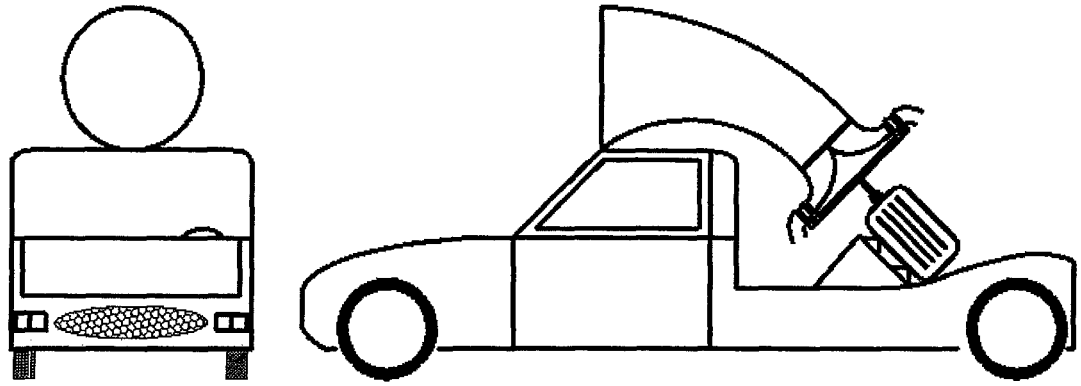
Figure 28:
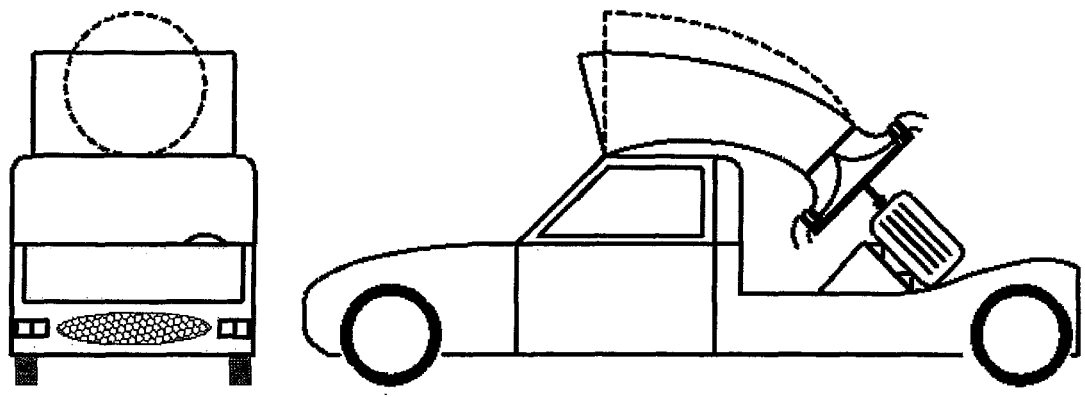

Averaged values of weight, cross sectional area, vehicular weight, and rolling resistance for small, sports car-type vehicles and for medium-sized cars were combined with approximations for the turbine/collector power output, component weight and drag coefficient to generate the vehicular performance expectation graphs found in FIGS. 21 and 22. For example, a 4-foot diameter collector inlet can be used for both cases. The turbine assemblies are not exactly scaled down versions of the "base case." The simulation runs were for a more compact design with a larger maximum vane height to minimum vane height ratio. Where a ratio of about 1.5-to-1 was used in the "base case," the automotive estimation uses a more aggressive about 2.32-to-1 vane height ratio. As can be appreciated, other ratios can be used for the base case and the road vehicle case. As the squash ratio is increased, all post collector radial dimensions can be reduced. These include the distributor outer diameter, the turbine diameters, the diffuser diameters, and the shroud dimensions. The bulk fluid model assumes the air expands and contracts vertically as fast the vane profile shape changes. Also, a more favorable collector bend angle of about 45° (compared to the base case 90° angle) was used for the automotive application; however, this is not required. A notable size related performance difference between the two cars is the point where self-sustained operation begins. As illustrated by the graphs of FIGS. 21 and 22, the smaller car becomes self-sustained at approximately 39 MPH and the medium sized car becomes self-sustained at approximately 43 MPH. FIG. 28 also illustrates how the vehicle's aerodynamic properties can accentuate the collector. Using the hood and windshield to effectively enhance the collector's function will allow reducing the overall height of the vehicle with collector.

Figure 23:
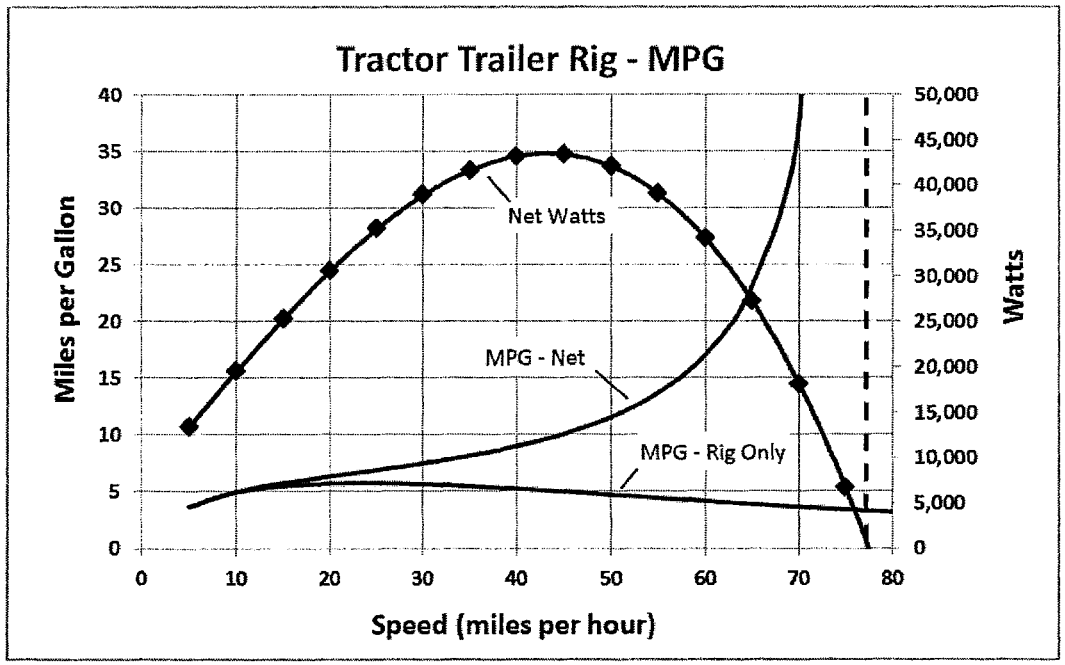

Large tractor-trailer rig transports are also amenable to the benefits of the radial design. Due to the increased power requirements and spatial limitations, two radial turbines are suggested as the configuration of choice; however, this is not required. These units are mounted side-by-side above the cab and utilize the most efficient straight collector shape. The overall expectation is that the performance gain of the straight collector and the performance loss of the more constrained discharge balance out. As illustrated in the graph of FIG. 23, self-sustained operation is predicted to occur near 78 MPH. The following chart shows estimated performance using a drag coefficient of 0.6 for the tractor-trailer rig. The estimated drag coefficient for the turbine collector is 0.989.

There are many options for heavy trucks utilizing wind energy supplementation of the primary power source. A hybrid configuration is attractive. Collector angles can be adjusted until the optimal flow performance for a given sized vehicle is found. The previously discussed inducement of a negative pressure draft condition at the outlet of the turbines is a potentially very rewarding performance enhancement. The size and pulling power limitation is directly related to both the total collector(s) inlet cross sectional area and the ratio of the sum of collector inlet cross sectional area(s) and the vehicle's frontal cross sectional area. Size is important due to wall effects becoming a lesser percentage of the pressure drop as size is increased. One turbine with cross sectional area "A" will outperform a combined two turbines each with "A/2" cross sectional area—while all 3 turbines are equally optimized for the flow conditions.

Futuristic Rail System

Due to the diameter needed for a collector to generate enough power to propel a train, a different track width may be utilized. The collector can be scaled down from the previously discussed "base case" example in order to meet both power demands and operational speeds that are practical for both cargo and personal conveyance. Autonomous vehicles on the track can be continuously present to provide power to the electrical distribution grid and the track itself can serve as a component of the grid. Interspersed amongst the power generation vehicles can be trains for delivery of goods and public transportation.

Fan, Blower, and Compressor Applications

Opposite the usage of power extraction from a motive fluid to drive a generator is the application of power to increase a fluid's velocity head. Typically, a single motor is needed to drive the turbines; however, very large applications may be configured similar to the wind energy layout where multiple motors can be utilized.

Most fan applications are expected to utilize combined stage mountings where all like stages are physically mounted on a common framework and rotate at the same rate. Very specialized applications (e.g., high volumetric flow rates) can implement a design allowing each stage's rotational rate being proportionally controlled via connective gearing to its adjacent stages and the requisite individualized stage suspension. These specialized applications duplicate the design flexibility observed in the wind energy application; however, the number of stages used for a fan application is generally dependent upon the required mass flow rate and pressure differential. Whereas most wind energy applications are generally three stages, designs that produce velocity head can potentially have a much larger number of stages and no upper limit has been established.

The terms 'bending' and 'straightening' do not apply as precisely in describing applications that impart energy into the fluid stream. It is convenient to designate the stage vane shapes by the inlet curvature. A type "R" vane has a purely radial oriented curvature at its inlet and a tangential curvature component at its outlet. A type "T" vane is opposite that of a type R vane. The type T vane has a tangential curvature component at its inlet and a purely radial oriented curvature at its outlet. The type T vanes have the greatest curvature and their function can be considered as "scooping." The type R vanes are typically stationary and serve as stationary stream flow conditioning stators; however, in specific applications they can be counter rotating to the stages with which they share a boundary.

The desired exit stream pressure and flow rate dictate the size of the turbine assembly, the number of stages required, the rotational rate, and power requirements. A convenient method of distinguishing between classifying a radial turbine as being a "blower or fan" versus a "compressor" is to consider all single pass radial configurations as being either a blower or fan and all multi-pass configurations as being a compressor. Typically, the flow of the first pass is radially inward (opposite that of power extraction). Most applications will use a type T stage as the initial stage. Preconditioning the inlet flow by positioning feed nozzles or baffling in some situations can be beneficial. To achieve stage-wise pressure increase requires the turbines to be imparting energy into the stream. The relationship between flow rate and discharge pressure is typical of fan curves where an increased consumer flow demand results in a decreased pressure component of the delivered velocity head. This design is very amendable towards incorporating a variable speed motor whose usage allows outlet pressure control over an expanded flow range as compared to a fixed rotational speed arrangement.

Compressors typically need a greater number of stages than practical in a single-pass configuration. Thus utilizing the radial turbine in compressor applications is accomplished by usage of multiple layers with each layer having multiple stages. The compressor configuration is thus a layered stack of single-pass radial assemblies. Flow alternates between radially inward and radially outward for each pass. The relatively high pressure drop required to abruptly reverse flow direction between each layer is an undesirable characteristic of the multi-pass configuration; however, it is the overall efficiency of the design compared against other equipment choices that determines its viability. The internal flow reversal between layers is achieved simply by having an open area with floor, ceiling, and center support that receives the fluid from one layer and allows it to escape into the adjoining layer. The external flow reversal is accomplished via a half-pipe shape bent into a circle. Optional baffling within the half-pipe will require optimization and validation through piloting studies as the flow characteristics are not easily modeled. The purpose of the baffling is to minimize any tangential flow so that close to pure radial flow is maintained. (Refer to the Internal Combustion Engine drawing FIG. 25 for an example of a multi-pass compressor.)

Fan and compressor performance is properly defined by measured experiment that generates ΔP to RPM performance charts for a range of curves each defining a fixed mass flow rate. Based upon wind simulation work that extracts power, a substantial improvement in efficiency is expected from the multi-stage radial configurations that are used to impart power.

Many current applications are expected to benefit by incorporating an improved efficiency primary mover. Of particular interest is the potential usage in air conditioning applications. If sufficient performance is realized, water vapor might displace halogenated refrigerants as the phase change medium of choice. Water vapor is assigned the R-718 distinction. Water vapor systems are commercially available and typically require high electricity costs to justify their more costly construction expense. Currently, the compressor makes up a large portion of the increased cost. Very high speed compressors are used in current applications. The radial design is expected to perform at greatly reduced rotational speed and the compressor cost is expected to be significantly lowered.

Figure 24:
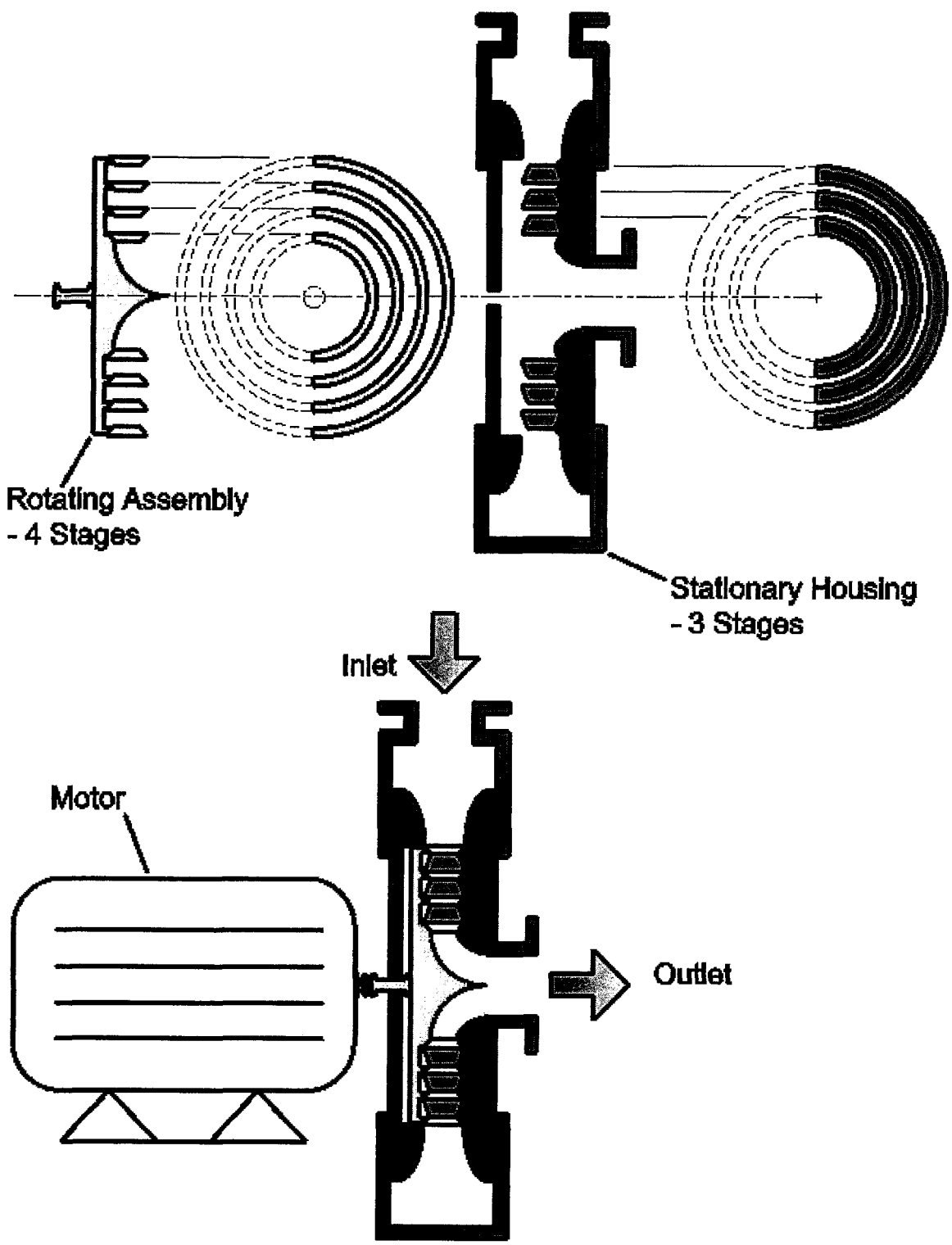
FIG. 24 illustrates a seven-stage single-pass blower wherein there are four bending stages that rotate as one assembly and the three straightening stages being stationary.

The illustration in FIG. 24 shows a seven-stage single-pass blower. Four bending stages rotate as one assembly and the three straightening stages are stationary.

Note that the impact half of the single cone receiver (functionally similar but reversed flow to that of the distributor in power extraction applications) is part of the rotating assembly. Additional fixed baffling may be added near the discharge to counter secondary flows. The containment half of the receiver is stationary. These same baffles can be used to support the impact half of the single cone receiver and thus make the impact surface stationary.

Internal Combustion Engine

Figure 25:
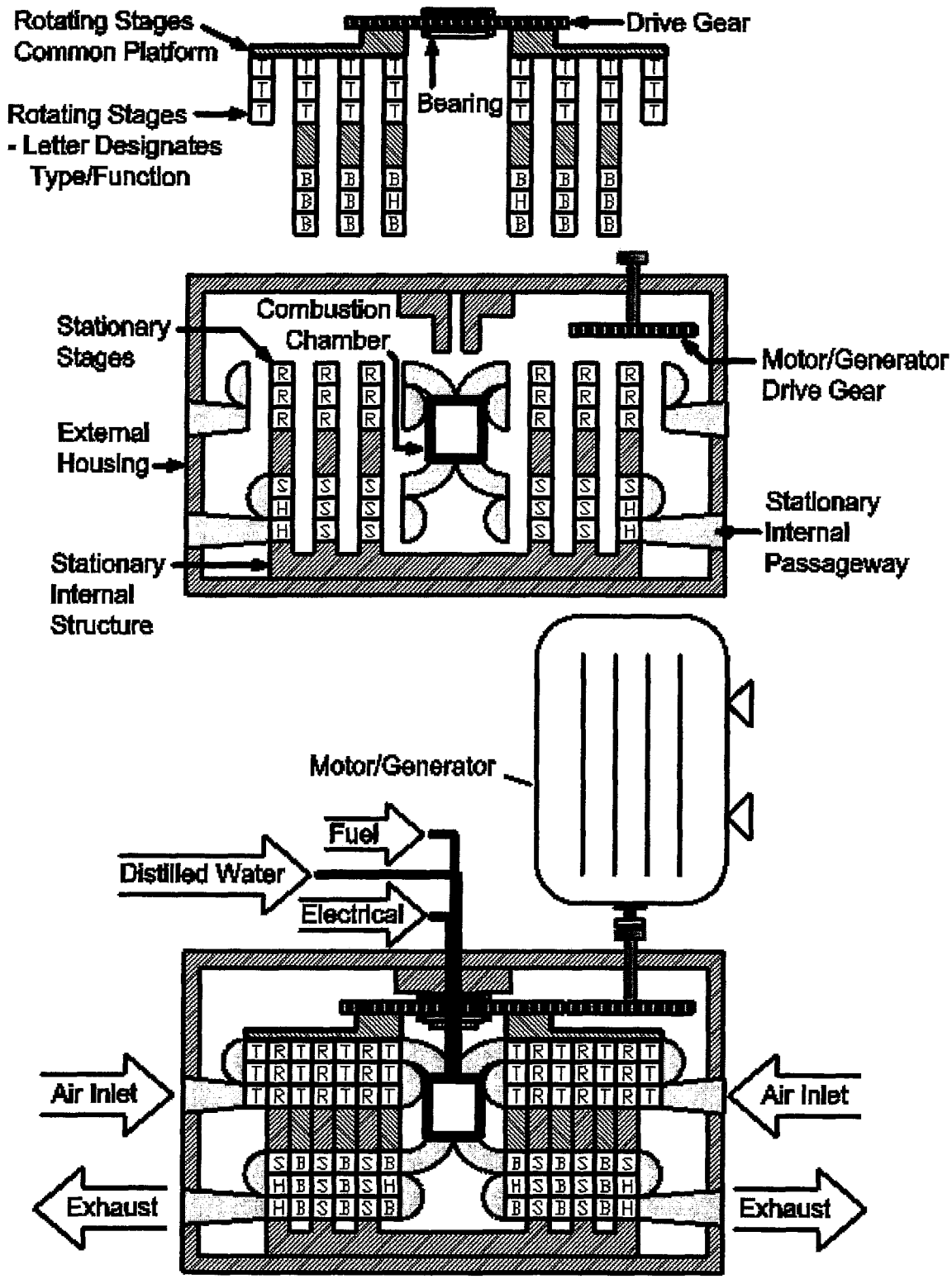
FIG. 25 illustrates the combining of a multi-layered inlet compressor, a combustion chamber, and a multi-layered outlet energy recovery turbine to create a radial turbine internal combustion engine.

The combination of an inlet compressor, a combustion chamber, and an outlet energy recovery turbine produces a new type of internal combustion engine. The compressing, combustion, and energy recovery steps are analogous to axial flow jet engine operation. The major incentive for the radial design is its low speed performance advantage. The radial internal combustion engine is expected to operate at greatly reduced RPM rates and be able to function with a minimum fuel flow requirement far lower than that of the axial flow jet engine. To achieve enough stages for adequate compression, a multi-layered configuration may be required. FIG. 25 illustrates a non-limiting multi-layered configuration.

The rotating stages are hung from one common platform that also incorporates a gear for transferring power to the generator. The rotating assembly consists of type T stages in the compressor section and type B in the energy recovery section. The combustor is centrally located. The stationary stages are affixed to the base of the assembly and consist of type S stages in the compressor section along with type R and type H stages in the energy recovery section. Note that each adjacent layer has radial flow in opposite direction and thus the vanes are also reversed as required due to the common direction of rotation. More specifically, the leading tangential edges for the type T stages for the first inlet layer are on the outer radius and the leading tangential edges in the middle layer are located on the inner radius. This reversal of the vane orientation is required for both the pre-combustor compressing and post-combustor energy capture sections.

Compressor Turbine Stage Letter Designations:

T—Stages with inlet curvature that has a tangential component and outlet curvature that is radially oriented. These stages act as "scoops" to force flow radially towards the combustor.

R—Stages with radially oriented inlet and outlet with a tangential component of direction. These stages are typically stationary and they condition the flow so that the next scooping stage has the most effective inlet flow orientation.

Energy Capturing Turbine Stage Letter Designations:

B—Bending stages that receive a radial flow and force the stream to take on a tangential velocity component. These are rotating stages.

S—Straightening stages that receive flow from bending stages. These stages are typically stationary and condition flow direction to make the bending stages most efficient.

H—Hybrid stages that complement their adjacent stage functionality. These stages are needed as a result of the multi-layer configuration. They may bend, straighten, or simply act as conduits.

The motor/generator serves a dual purpose. First, it is used to establish rotation and air flow prior to initiating fuel flow to the burner and starting the combustion process. Second, it converts the captured shaft work into electrical power after operational speeds have been established.

The addition of distilled water is optional. It can be used to limit maximum temperatures within the turbine and allow a greater range of metallurgical options to be considered.

All radial designs discussed in this patent are negatively impacted by pressure drop. The abrupt flow directional changes encountered in the transition from one layer to the next is a compromise necessitated by compactness of design criteria. Stationary equipment with lesser spatial constraints will tend to have more stages per layer and a reduced number of layers. For example, one layer for compression and one layer for energy capture; however, this is not required.

Hydroelectric Applications

Figure 26:
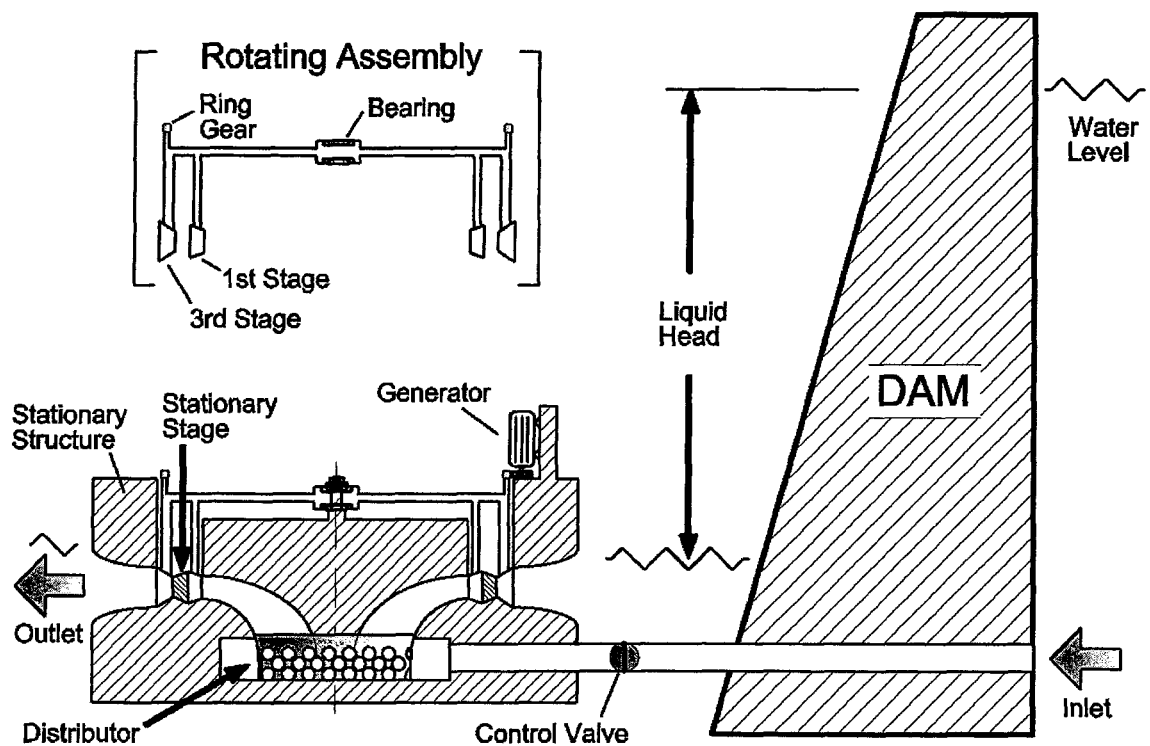
FIG. 26 illustrates an arrangement for hydroelectric power generation where the dam height can be as little as a few feet in height.

The equipment utilized for extracting power from water is analogous to the wind application except that the dam serves as both the collector and the shroud. One non-limiting configuration is illustrated in FIG. 26. This equipment includes: (1) a reservoir or source of water, (2) a feed pipe with flow control valve, (3) an inlet distributor that feeds the inner most turbine, (4) radial turbines, (5) an exhaust diffuser, (6) one or more generators with electrical conditioning equipment and controls, and (7) the structure to house and tie all the components together.

The low speed performance of the radial design favors low height dams. The generator can be placed above flood stage or located near the rotating turbine assembly ring gear. Cavitation problems are not anticipated due to the extremely low pressure drop of the radial design.

Note that the design illustrated in FIG. 26 is driven by head pressure alone. There is no accelerating inlet collector funnel. The hydroelectric application's single cone distributor's profile determines if the stream is accelerated. Based upon simulated flow characteristics observed in the wind application, the profile with the least pressure drop is most likely optimal for low head applications. High head applications may benefit from some acceleration. The bulk flow model is insufficient for this type of study and advance CFD analysis and piloting studies need to be part of the design optimization process. The perforated ring inlet distributor provides even flow distribution. Advanced fluid flow analysis can be used to optimize the perforation's individual size and placement. The turbine bearings, ring gear, and generator drive gear can optionally be all located above the water line.

The efficiency of the radial design at low head pressure can dramatically increase the number of viable sites. The dams would be relatively low height. Even a few feet of head can produce usable quantities of power provided the flow rate is sufficient. Natural and manmade tidal basins and canal locks are potentially viable; however, streams with continual flow are desirable.

A recommended design feature for the hydroelectric configuration is to have the perforated distributor ring slightly smaller in diameter than the lower half of the single cone distributor; however, this is not required. Thus the perforated distributor ring, the upper half of the single cone distributor, and the rotating bending vane assembly can be lifted or placed as a single unit.

Liquid Pumping Applications

Reversing the hydroelectric configuration effectively creates a liquid pump suitable for low viscosity liquids. Additional head can be had by adding stages and motor power; however, the expected service would be low head and high volume as typical of irrigation, flood control, and water and sewage treatment applications. Larger pumps can use the offset motor and ring gear as illustrated with the hydroelectric configuration. The ring gear configuration allows a multiple motor configuration for high capacity applications. Smaller scale pumps can use inline motor configuration which provides a more compact configuration. The perforated distributor is unnecessary for pumping service. The outlet valve may be unnecessary if the discharge is above the elevated liquid level, or a directional check valve may be needed to prevent reverse flow when the pump is turned off.

Figure 27:
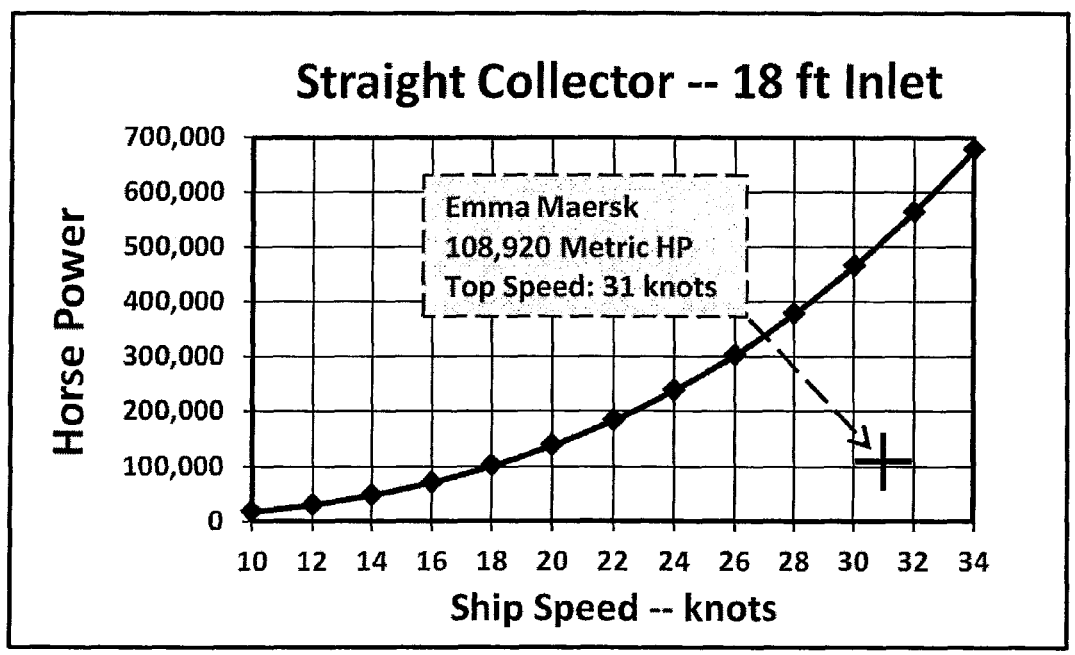
FIG. 27 is a graph that illustrates the horse power verses vessel speed for a submerged and forward facing straight shaped collector with a particular waterborne vessel as an example case; and, FIG. 28 provides two illustrations of different collector inlet shapes on a vehicle.

A combination pumping/generating capability can be considered as a means of energy storage. Two retention basins can be used and when excess power is available water is pumped into the elevated basin. Energy is recovered by allowing flow from high to low with the motors functioning as generators Waterborne Vessel Propulsion The usage of a submerged and forward facing straight shaped collector for waterborne vessels is analogous to the previously discussed mobile applications. The power produced by the collector-turbine can potentially exceed the power required to propel it through the water. The excess power can be used to supplement the primary motive force engines. Achieving self-sustained operation appears to be feasible. Conventional drive propellers can possibly be replaced with radial design pump jet propulsion. All geometric dimensions are sized and optimized similar to previously discussed applications. Limiting maximum rpm is most likely necessary. A suggested control scheme for limiting the rpm and controlling the power produced is to raise and lower a leading, prow-shaped, vertically oriented bar in front of the collector inlet. The prow's action is twofold. It diverts flow around the collector and acts as an obstruction. Typical values for seawater density and viscosity are used to generate the graph of predicted performance. The flow simulation has been simplified to reflect non-compressible hydraulic flow. The performance figures as illustrated in FIG. 27 have 15% subtracted to account for generator, gearing, and parasitic losses. Enhanced performance using draft and non-rectangular turbine passageways has not been included.

To appreciate the magnitude of performance potential, a modern and very large container ship engine power and top speed are referenced on the graph (FIG. 27) for comparison purposes.

Additional Mechanical Detail

This invention aims at defining the flow path, the flexibility of geometric design parameters used to optimize each application, and introducing some of the many applications of which the radial design can be utilized. The precise mechanical details are not defined. Materials of construction, mechanical component stress analysis, and precise component thickness profiles are examples of mechanical specifications that are absent.

All of the radial applications require the design to incorporate features to facilitate the assembly, disassembly, and maintenance tasks. Of particular concern is the need to maintain accurate turbine assembly alignment while turbine assemblies are brought together or separated. The size of the radial turbine assembly dictates the practical solutions needed to accomplish the alignment task. The huge wind energy applications set the upper size limit and the lower size limit might be a fan used for applications such as hair dryers or for cooling a computer. Suggestions based upon size include the following:

1) The smallest designs might utilize threaded guide rods that are removable after the final mating task is completed. Precisely sized and positioned bushings in one half of the assembly housing would engage the guide rods secured to the other half and prevent misalignment during separation and reassembly.

2) Mid-sized designs where the turbine assembly is large enough to not be easily handled one-handed require alignment control more robust than simple guide rods. Here, equally spaced radial lifting lugs can be considered. Threaded rods might be used to in conjunction with the lifting lugs. Each rod is rotated in turn only a slight amount as the two major assemblies are slowly separated or mated. Some sort of mechanism for measuring and maintaining alignment is needed to determine which rod to turn next and by how much. This measuring method may be precision levels or an optical device. Perhaps a low power laser aiming device secured to a properly aligned mount and kept on a carefully positioned target located on the other half of the assembly.

3) Very large scale wind applications may require custom designed auxiliary equipment used for assembly and maintenance tasks. Hydraulically-controlled jacks are a possibility. Computer assistance is a possibility where the alignment aim point deviation is used to determine which adjustments are needed to establish near perfect alignment throughout the entire disassembly or mating process. Precautionary steps can be taken to block or divert wind flows so that rotational torque does not occur during the disassembly or mating task. Additionally, large scale designs require well distributed lifting forces applied to specifically engineered locations. A lift without proper lifting force distribution may damage or even ruin the rotating assembly by the action of its own weight distorting components beyond acceptable limits.

Figure 1:
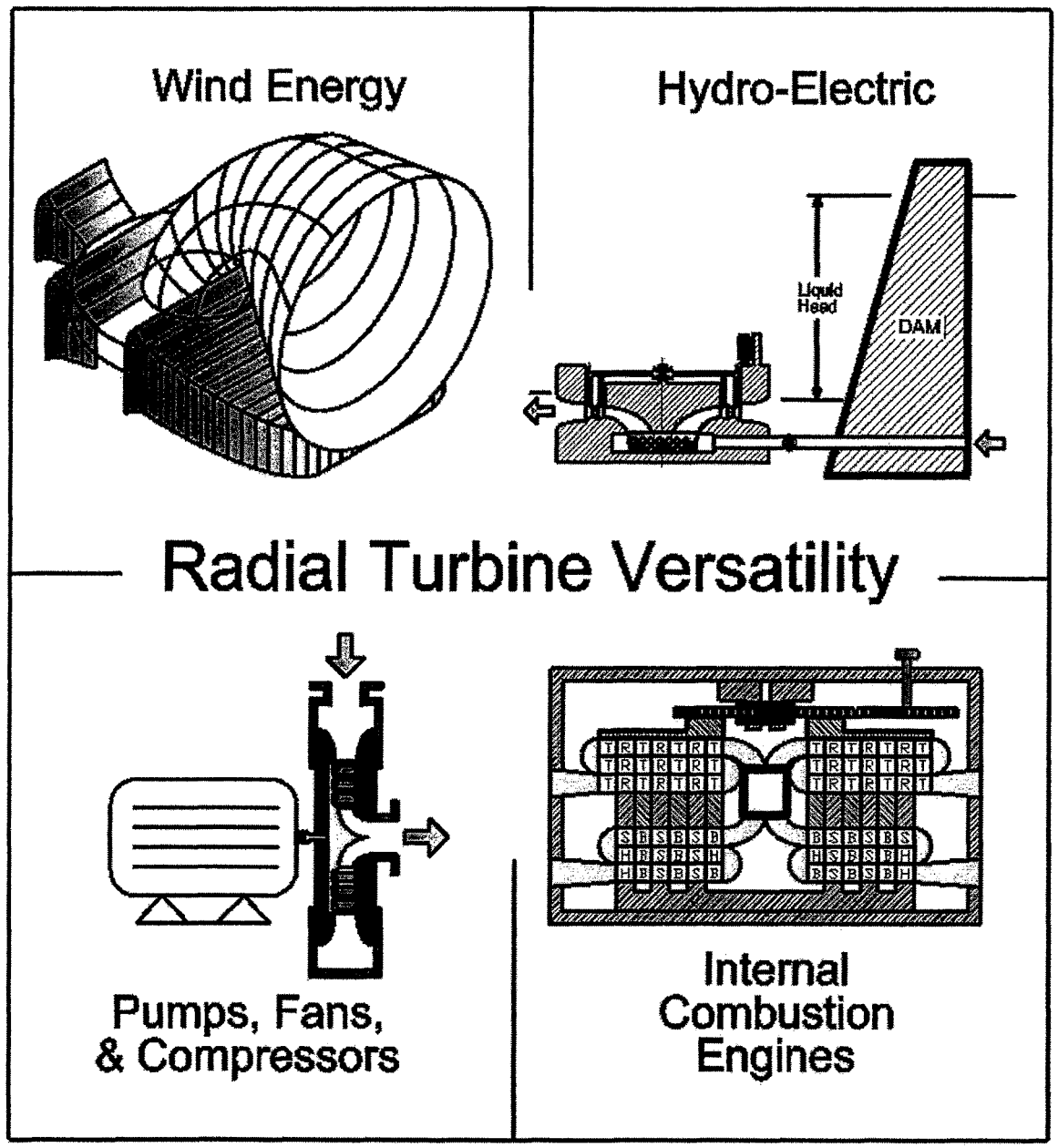
FIG. 1 provides example radial turbine configurations for power extraction (wind energy and hydroelectric), power imparting (pumps, fans, compressors), and combined power imparting and power extraction in the form of a new type of internal combustion engine.
Figure 2:
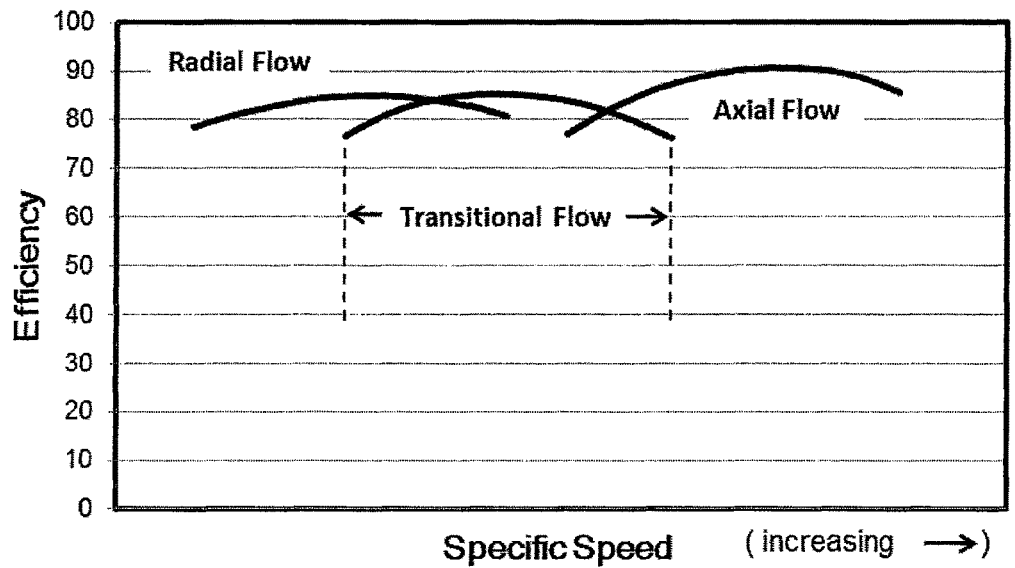
FIG. 2 is a graph that shows through curves of efficiency versus specific speed whether the optimal flow regime is either radial, axial or the transitional range between these two.
Figure 2:
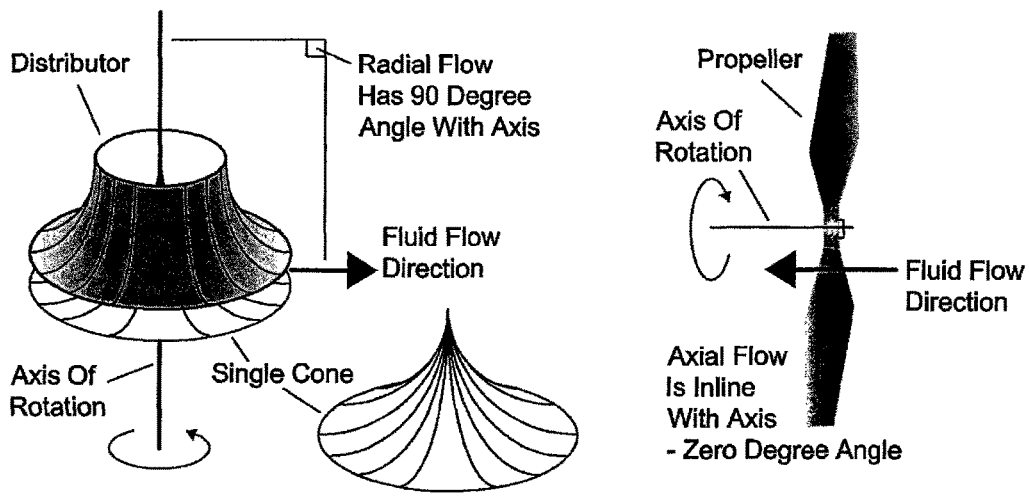

The designs presented in this invention have, for the most part, flow directions opposite equipment configurations that are commonly being used today. The radial design favors inward flow for imparting energy onto the fluid stream. This is opposite squirrel cage type fans and very high speed radial flow gas phase compressors. Also this flow direction is opposite the flow direction of the common centrifugal type of pump. The radial design favors outward flow for capturing energy from streams in motion. This flow direction particularly contrasts to that of the Francis type turbine that flows radially inward while accelerating the stream to conclude with a more axial flow transfer of energy at the outlet. Ideally, as streams become energy depleted, they should transfer remaining energy in a radially outward direction using designs that minimize pressure drop. The radial design allows great flexibility where stages can rotate independently or have carefully matched geometry that allows all similar functioning (i.e., flow bending) stages to rotate as a single assembly. Perhaps the most misguided choice of flow orientation for an application is the usage of axial flow as found in the wind energy market where huge propeller type axial flow designs are being used to extract energy from wind with an exceptionally low specific speed. Of course options must exist before the proper choice of equipment design can be made and the radial design provides the fundamentally correct flow direction for extracting energy from low specific speed fluid streams of either gaseous or liquid phase. Equal to axial flow being the wrong choice for extracting energy from wind is the usage of axial flow in a majority of fan and blower applications. Fans and blowers typically have near stagnant velocity inlet streams and thus the lowest possible specific speed. The first qualitative graph (FIG. 2) presented in this application clearly conveys why radial flow is the obvious choice for accelerating near stagnant velocity streams.

The radial design configurations may be the best economical choice for producing commercial quantities of electricity and does so in a much more environmentally sound manner than present alternatives. The design is not flawless, as it does generate heat as its emission byproduct; however, as the supply of fossil fuels and air quality concerns continue to mount, the radial design's advantages have it standing alone as the clear winner. No other mechanical energy capturing device is anticipated to rival the simplicity and fundamentally correct choice of flow management provided by the radial design.

Transforming the transportation systems can only occur if an alternative exists. The radial designs provide that alternative. Obtrusive wind collectors will by definition never be sleek and certainly lose out in a beauty contest against the curves found on today's sports cars; however, gaining the ability to travel long distance without the burden of fuel costs is very advantageous. Advanced and autonomous railway systems are the smart choice for land based transports of both products and people. The shipping industry is also easily recognized as needing a technological advancement. Today's ships are huge polluters and energy hogs. The radial designs can reduce or eliminate both of these negative attributes.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed:

1. A turbine system configured for use i) in a power system for a vehicle, ii) in a power-generating wind turbine system, iii) in a pump, iv) in a compressor, v) as a component of an internal combustion engine, or vi) in a hydroelectric generator, said turbine system comprising a collector, a distributor, a diverter movable between closed and open positions, a first multi-vane radial turbine stage rotatable about an axis, said rotation of said first multi-vane radial turbine stage configured to generate rotational output, said collector configured to capture and direct a portion of a freely flowing fluid to said distributor, said distributor configured to distribute and turn said flowing fluid from said collector into a radially outward flow that is oriented into an entrance of said first multi-vane radial turbine stage, said diverter configured to selectively divert at least a portion of said flowing fluid from said distributor away from said first multi-vane radial turbine stage and to at least partially act as an obstruction in said flowing fluid, said turned flowing fluid contacting a plurality of vanes on said first multi-vane radial turbine stage as said turned flowing fluid flows radially outward from said axis to thereby cause said first multi-vane radial turbine stage to rotate about said axis.

2. The turbine system as defined in claim 1, wherein said distributor is configured to split said fluid received from said collector into a plurality of fluid streams, at least a first and second fluid stream from said distributor directed radially outwardly from said axis of said first multi-vane radial turbine stage.

3. The turbine system as defined in claim 1, wherein said collector has a first opening, a second opening and a body passageway therebetween, said first opening having a first cross-sectional area and configured to receive said freely flowing fluid and direct said received fluid into said body passageway, said second opening having a second cross-sectional area and configured to allow said fluid to exit said body passageway and said collector, said first cross-sectional area is greater than said second cross-sectional area, and wherein the cross-sectional area of the body passageway normal to a central flow path of said collector body decreases gradually along the central flow path from the first cross-sectional area to the second cross-sectional area.

4. The turbine system as defined in claim 3, wherein said central flow path is curved along its entire length between said first opening and said second opening.

5. The turbine system as defined in claim 1, wherein a central flow path of said collector may remain in a straight line congruent with the direction of a feed stream of the freely flowing fluid; or may have curvature up to 90°.

6. The turbine system as defined in claim 1, wherein said distributor includes a first passageway whose perimeter contains the fluid from the collector, a second passageway that directs the fluid into the first turbine stage, and an interconnected passageway body that contains the fluid between said passageways.

7. The turbine system as defined in claim 1, wherein the first multi-vane radial turbine stage has an overall cylindrical geometry, said first multi-vane radial turbine stage having a first opening, a second opening, and a body passageway therebetween, said first opening primarily oriented towards a common cylindrical axis, said body passageway of said first multi-vane radial turbine stage being confined by surfaces that comprise a floor and a ceiling when said common axis is vertical with a horizon, positioned in said body passageway is a plurality of curved vanes extending from said floor to said ceiling and which are configured to interact with said fluid stream to thereby cause said fluid stream's direction of flow to be altered.

8. The turbine system as defined in claim 7, wherein the curved vanes that span from said floor to said ceiling incorporate a corner rounding profile, varying vane wall thickness, varying floor to ceiling height, or combinations thereof.

9. The turbine system as defined in claim 1, wherein the first turbine stage includes a suspension member that allows individual freedom of rotation around said axis, the suspension member including a bearing.

10. The turbine system as defined in claim 1, including a diffuser, said diffuser having a first opening, a second opening and a body passageway therebetween, said first opening having a first cross-sectional area and configured to receive fluid flowing radially outward from an outer most turbine stage and direct such received fluid into said body passageway, said second opening having a second cross-sectional area and configured to allow fluid to exit said body passageway and said diffuser, said first cross-sectional area is less than said second cross-sectional area.

11. The turbine system as defined in claim 10, including a shroud, said shroud positioned proximate to said diffuser to reduce interference from fluid that did not enter said collector with fluid that is exiting said diffuser.

12. The turbine system as defined in claim 11, wherein said shroud includes multiple sections around the periphery of said diffusor to optimize usage of a negative gauge pressure draft that results from said fluid being displaced around an object placed in its flow path.

13. The turbine system defined in claim 1, further comprising a plurality of turbine stages including the first turbine stage and at least one stationary turbine stage, wherein increased stage count is achieved by having multiple layers of turbine stages, flow within each layer of stages reverses direction from a preceding layer of stages from radially inward to radially outward or from radially outward to radially inward flow.

14. The turbine system defined in claim 1, wherein said collector, said distributor, said diverter and said first turbine stage are mounted on a moving platform such that a differential velocity between said platform and fluid surrounding said moving platform provides a velocity gradient needed for said turbine system to extract power.

15. The turbine system as defined in claim 14, further including a movable frame that is configured to allow said collector, said distributor, said at least one non-rotating turbine stage, and a shroud to be connected to said frame, said frame including wheels that enable said movable frame to travel on a road or rail system.

* * * * *